United States Patent
Suzuki

(10) Patent No.: US 8,040,158 B2
(45) Date of Patent: Oct. 18, 2011

(54) FREQUENCY DIFFERENCE DETECTION APPARATUS AND METHOD, FREQUENCY DISCRIMINATION APPARATUS AND METHOD, AND FREQUENCY SYNTHESIS APPARATUS AND METHOD

(75) Inventor: Yoshito Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1966 days.

(21) Appl. No.: 11/883,721

(22) PCT Filed: Jun. 14, 2005

(86) PCT No.: PCT/JP2005/010842
§ 371 (c)(1),
(2), (4) Date: Jan. 7, 2011

(87) PCT Pub. No.: WO2006/087828
PCT Pub. Date: Aug. 24, 2006

(65) Prior Publication Data
US 2011/0121866 A1 May 26, 2011

(30) Foreign Application Priority Data

Feb. 16, 2005 (JP) ................................. 2005-038505

(51) Int. Cl.
*H04N 9/45* (2006.01)
*H03D 13/00* (2006.01)
(52) U.S. Cl. ................. 327/41; 327/39; 327/40; 327/42; 348/500; 348/505; 348/536; 348/537
(58) Field of Classification Search .............. 327/39–49; 348/454, 457, 500, 505–508, 536, 537, 638, 348/640, 641
See application file for complete search history.

(56) References Cited

U.S. PATENT DOCUMENTS

| | | | | |
|---|---|---|---|---|
| 4,090,145 A | | 5/1978 | Webb | |
| 4,561,021 A | * | 12/1985 | Abe | 348/558 |
| 4,594,555 A | | 6/1986 | Hilton | |
| 4,847,678 A | * | 7/1989 | McCauley | 348/537 |
| 6,172,713 B1 | * | 1/2001 | Morita | 348/557 |
| 2004/0243329 A1 | | 12/2004 | Seki | |

FOREIGN PATENT DOCUMENTS

EP 0 373 517 A2 12/1989
EP 0 789 466 A2 8/1997
(Continued)

*Primary Examiner* — Lincoln Donovan
*Assistant Examiner* — Patrick O'Neill
(74) *Attorney, Agent, or Firm* — Birch, Stewart, Kolasch & Birch, LLP

(57) ABSTRACT

An apparatus having a complex sine wave generating circuit (3) that generates a complex sine wave, a multiplying circuit (4) that multiplies an input signal by the complex sine wave, a first integrating circuit (5) that integrates the product obtained by the multiplying circuit (4) in the time direction, a first squaring circuit (6) that takes the square of the absolute value of a complex signal output by the first integrating circuit (5), a second squaring circuit (7) that takes the square of the absolute value of the instantaneous amplitude of the input signal, a second integrating circuit (8) that integrates the results obtained by the second squaring circuit (7) in the time direction, and a frequency difference calculating circuit (9) that finds the difference between the frequency of the input signal and the oscillation frequency of the complex sine wave on the basis of the ratio between the output signal level of the first squaring circuit (6) and the output signal level of the second integrating circuit (8).

23 Claims, 17 Drawing Sheets

FOREIGN PATENT DOCUMENTS

| JP | 4-503441 A | 6/1992 |
| JP | 9-233136 A | 9/1997 |
| JP | 10-51802 A | 2/1998 |
| JP | 10-174112 A | 6/1998 |
| JP | 2004-242324 A | 8/2004 |
| JP | 2004-361124 A | 12/2004 |

* cited by examiner ated by a local oscillator to down-convert the band-limited input signal and removes unwanted high frequency components with a low-pass filter. A similar configuration is seen in Patent Document 2, where it is used as part of a demodulator that detects the amplitude of a modulating signal from a high-frequency signal generated by amplitude modulation. Amplitude modulation uses a carrier signal to up-shift the unaltered frequency distribution of the modulating signal, so the demodulator can be regarded as a circuit that detects the input signal by down-shifting its frequency distribution by an amount equal to the carrier frequency.

FREQUENCY DIFFERENCE DETECTION APPARATUS AND METHOD, FREQUENCY DISCRIMINATION APPARATUS AND METHOD, AND FREQUENCY SYNTHESIS APPARATUS AND METHOD

FIELD OF THE INVENTION

The present invention relates to an apparatus and method for detecting frequency differences, a frequency discriminator and frequency discrimination method, and a frequency synthesizer and frequency synthesizing method.

BACKGROUND ART

One apparatus for measuring the frequency distribution of an input signal is a spectrum analyzer. The configuration of a circuit that can be used as the detector of a spectrum analyzer is shown in Patent Document 1: it detects the amplitude and phase of the input signal by using a complex sine wave generated by a local oscillator to down-convert the band-limited input signal and removes unwanted high frequency components with a low-pass filter. A similar configuration is seen in Patent Document 2, where it is used as part of a demodulator that detects the amplitude of a modulating signal from a high-frequency signal generated by amplitude modulation. Amplitude modulation uses a carrier signal to up-shift the unaltered frequency distribution of the modulating signal, so the demodulator can be regarded as a circuit that detects the input signal by down-shifting its frequency distribution by an amount equal to the carrier frequency.

There are cases in which what is wanted is not to detect the entire frequency distribution of the input signal, but to determine automatically whether the input signal includes a particular frequency component. For example, it may be necessary to determine what color television system is being used in an analog broadcast. The color subcarrier frequency in the NTSC system used in Japan and the United States of America is approximately 3.58 MHz (the precise value is 3.579545 MHz); the PAL system used in Europe has a different color subcarrier frequency of approximately 4.43 MHz (the precise value is 4.43361875 MHz). In the SECAM system the color subcarrier frequency switches between 4.25 MHz and 4.40625 MHz once per horizontal interval. A multi-standard color television receiver therefore requires a circuit that discriminates the color subcarrier frequency of the input video signal.

In color television transmission, depending on the channel characteristics, the amplitude of the color subcarrier may be greatly attenuated, or much noise may be present. Just by measuring the signal amplitude or signal power at each frequency with the same configuration as a spectrum analyzer and adding a circuit to evaluate the magnitude of the measured value of a particular frequency component, accordingly, it would not necessarily be possible to identify the color subcarrier frequency of the input video signal correctly.

In Patent Document 3 there is an exemplary circuit that determines whether the color subcarrier frequency is 3.58 MHz or 4.43 MHz, using a trap filter with a stop-band around 4.43 MHz. It extracts the color burst signal that forms the color subcarrier frequency reference from the input video signal, compares the color burst signal with a signal obtained by passing the color burst signal through the trap filter, and determines the color subcarrier frequency of the input video signal to be 4.43 MHz if it is attenuated by the trap filter, or 3.58 MHz if it is not attenuated. A feature of this method is that the frequency discrimination result does not depend on the amplitude of the color burst signal, but when the noise amplitude is large, there is the possibility of incorrect frequency discrimination, depending on whether or not the noise component is attenuated by the trap filter.

In Patent Document 4 there is an exemplary circuit that determines whether the color subcarrier frequency changes at each horizontal interval, and uses the result of this determination to recognize whether or not the input video signal is a SECAM signal. This circuit makes use of the property that the phase delay of an RLC resonant circuit is approximately +90 degrees on the high-frequency side and approximately −90 degrees on the low-frequency side. Since discrimination is not affected even if the resonant frequency of the resonant circuit is slightly displaced, the 4.40625-MHz (or 4.25-MHz) color subcarrier frequency is down-converted to 654 kHz (or 810 kHz) by use of a 5.06-MHz complex sine wave, and the resonant frequency of the resonant circuit is 732 kHz. If the real component of the down-converted signal is passed through the resonant circuit and multiplied by the imaginary component, whether the frequency of the input signal is higher or lower than a reference frequency (5.06 MHz−732 kHz=4.328 MHz) can be determined by detecting whether the product is positive or negative.

The features of this system are that the frequency discrimination result does not depend on the amplitude of the color subcarrier and is comparatively immune to noise, but it is not suited for applications that must discriminate large frequency differences. To maintain accurate frequency discrimination when the frequency difference is small in relation to the resonant frequency, it is necessary to use a resonant circuit with a high Q value. If a resonant circuit with a high Q value is used, however, then an input signal differing greatly from the resonant frequency will be unable to pass through the resonant circuit, and the product will be close to zero regardless of the frequency difference. Since the product value is close to zero even when the input signal frequency is close to the resonant frequency, it is difficult to discriminate an input signal with a frequency that actually differs greatly from the resonant frequency correctly. If used as is, this SECAM discrimination circuit cannot accurately determine whether the color subcarrier frequency is 3.58 MHz or 4.43 MHz.

Patent Document 1: U.S. Pat. No. 4,594,555 (pp. 21-22, FIG. 6)

Patent Document 2: U.S. Pat. No. 4,090,145 (pp. 10-11, FIG. 4)

Patent Document 3: Japanese Patent No. 3500883 (p. 4, FIG. 1)

Patent Document 4: Japanese Patent Application Publication No. H10-051802 (p. 3, FIG. 1)

DISCLOSURE OF THE INVENTION

Problems to Be Solved by the invention

This invention addresses the above problems with the object of obtaining a frequency difference detection apparatus that is immune to noise and can discriminate the difference between the frequency of an input signal and a reference frequency regardless of their values.

Means of Solution of the Problems

In a frequency difference detection apparatus that detects the difference between the frequency of an input signal and a predetermined reference frequency, the present invention provides a frequency difference detection apparatus comprising:

a complex sine wave generating means for generating a complex sine wave having an oscillation frequency equal to the reference frequency;

a multiplication means for multiplying the complex sine wave generated by the complex sine wave generating means by said input signal;

a first integrating means for integrating the result of multiplication by the multiplication means in the time direction;

a first absolute value calculating means for finding a value proportional to an absolute value, or a square of the absolute value, of the result of integration by the first integrating means;

a second absolute value calculating means for finding a value proportional to an absolute value, or a square of the absolute value, of an instantaneous amplitude of said input signal;

a second integrating means for integrating the result obtained by the second absolute value calculating means in the time direction; and a frequency difference calculating means for finding the difference between the frequency of the input signal and the reference frequency, based on a ratio between the result obtained by the first absolute value calculating means and the result obtained by the second absolute value calculating means.

Effect of the Invention

As this invention is structured so as to multiply the input signal by a complex sine wave having an oscillation frequency equal to the reference frequency, by means of the complex sine wave generating means, and integrate the resulting product, noise components are removed by the integration process, with the effect that the difference between the frequency of the input signal and the reference frequency can be determined with high accuracy even when the input signal includes much noise.

EXPLANATION OF REFERENCE CHARACTERS

1 direct current rejection circuit, 2 burst gate, 3 complex sine wave generating circuit, 4 multiplying circuit, 5 first integrating circuit, 6 first squaring circuit, 7 second squaring circuit, 8 second integrating circuit, 9 frequency difference calculating circuit, 10 cosine wave generating circuit, 11 90-degree phase shifter, 12 first multiplier, 13 second multiplier, 14 third multiplier, 15 fourth multiplier, 16 subtractor, 17 adder, 18 first integrator, 19 second integrator, 20 first square calculator, 21 second square calculator, 22 adder, 23 divider, 24 third integrator, 25A, 25B, 25C thresholding circuits, 26 first absolute value calculating circuit, 27 second absolute value calculating circuit, 28 square root calculator, 29 first filter circuit, 30 second filter circuit, 31 frequency difference calculating circuit, 32 first coefficient ROM, 33 second coefficient ROM, 34 first convolver, 35 second convolver, 36 third convolver, 37 fourth convolver, 38 subtractor, 39 adder, 40 divider, 41 fourth integrator, 42 third filter circuit, 43 third integrating circuit, 44 frequency difference calculating circuit, 45 line inverting pulse generating circuit, 46 divider, 47 fifth integrator, 48 sixth integrator, 49 subtractor, 50 free-running oscillation frequency selection circuit, 51 phase comparator, 52 loop filter, 53 oscillator, 71, 72, 73 frequency difference detectors, 74 free-running oscillation frequency selection circuit

BEST MODE OF PRACTICING THE INVENTION

First Embodiment

Figure 1:
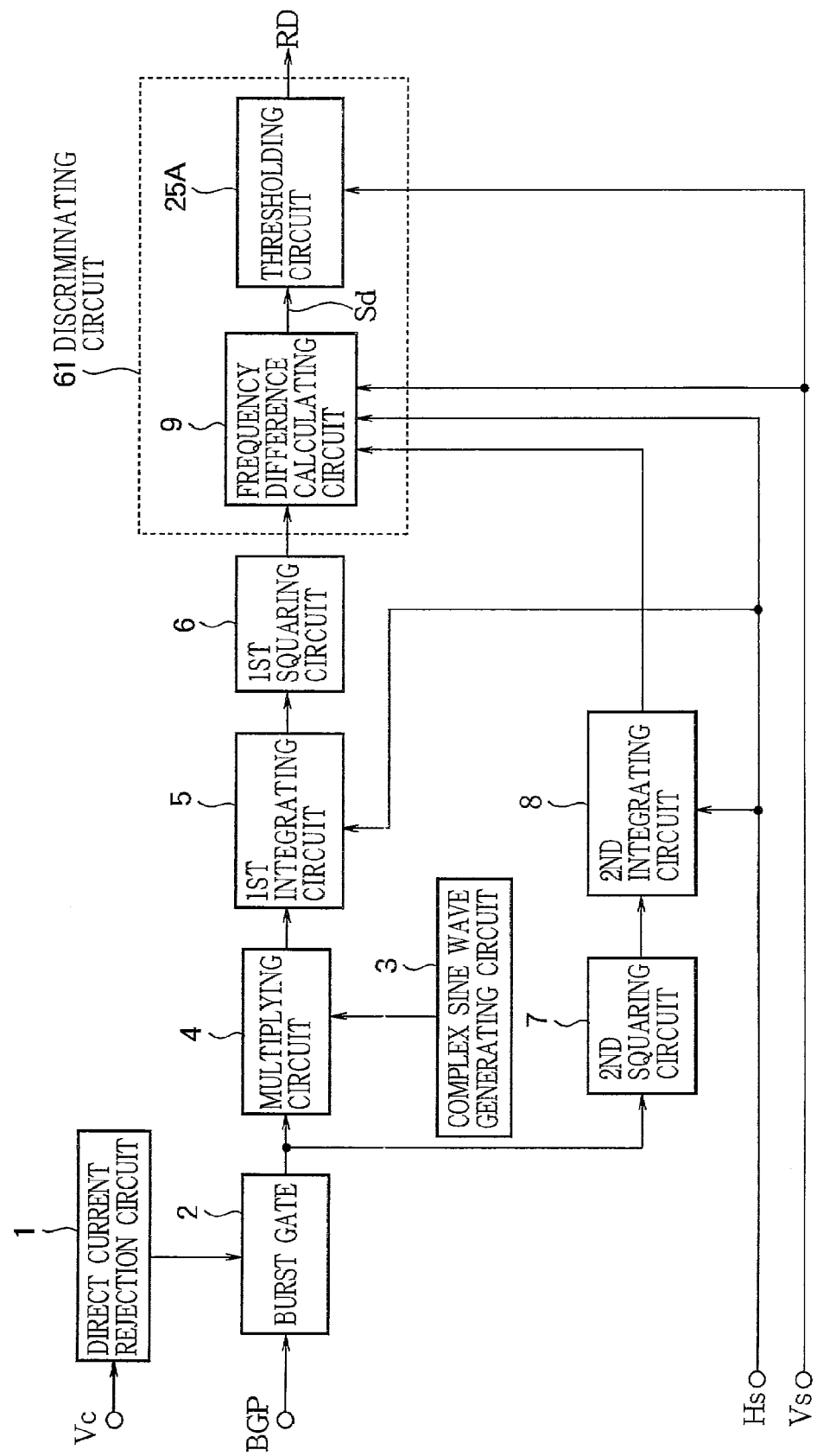
FIG. 1 is a block diagram showing the overall structure of the frequency discrimination apparatus in a first embodiment of this invention.

FIG. 1 shows the structure of the frequency discrimination apparatus in a first embodiment of this invention and a frequency difference detection apparatus forming a part thereof. The frequency discrimination apparatus in FIG. 1 is structured to be capable of determining whether the color subcarrier frequency of an input video signal is 3.58 MHz or 4.43 MHz; the frequency difference detection apparatus of which the frequency discrimination apparatus forms one part is structured to be capable of detecting the deviation of the color subcarrier frequency of the input video signal from 3.58 MHz or 4.43 MHz.

A composite video signal Vc is input to the direct current rejection circuit 1. The direct current rejection circuit 1 is a filter with a direct current gain of zero that passes frequency components from the NTSC to the PAL color subcarrier frequencies of 3.58-MHz to 4.43-MHz substantially without attenuation. Since the principal purpose of the direct current rejection circuit 1 is to block the direct current component, it may be a bandpass filter or a high-pass filter with a stop-band at the direct current value. It may also be a clamping circuit that removes the direct current component from the video signal (in other words, a circuit that attenuates a signal level equivalent to the direct current level of the input signal from the input signal and outputs the attenuated input signal). Video clamping (e.g., pedestal clamping) is a well-known art.

The output signal of the direct current rejection circuit 1 is input to the burst gate 2. The burst gate pulse BGP which is also input to the burst gate 2 is a signal that is active in part of the back porch of the horizontal blanking interval. The burst gate 2 uses the burst gate pulse BGP to extract the color burst signal from the output signal of the direct current rejection circuit 1.

The first integrating circuit 5 generates a complex sine wave having an oscillation frequency equal to a certain reference frequency f. The multiplying circuit 4 takes the product of the color burst signal extracted by the burst gate 2 and the complex sine wave generated by the complex sine wave generating circuit 3. The output signal of the multiplying circuit 4 is complex-valued. The first integrating circuit 5 is a circuit that integrates the output signal of the multiplying circuit 4 in the time direction over one horizontal period. The horizontal period can be measured on the basis of the horizontal synchronizing signal. If the integrated value is reset to zero each time the reference edge of the horizontal synchronizing signal is detected, the integration result is updated once per horizontal period. The first squaring circuit 6 takes the square of the absolute value of the complex signal provided as the output signal of the first integrating circuit 5.

The color burst signal extracted by the burst gate 2 is also input to the second squaring circuit 7. The second squaring circuit 7 takes the square of the absolute value of the output signal of the burst gate 2. The second integrating circuit 8 integrates the output signal of the burst gate 2 in the time direction over one horizontal period. The horizontal period can be measured on the basis of the horizontal synchronizing signal as in the first integrating circuit 5.

The frequency difference calculating circuit 9 obtains the difference between the color subcarrier frequency and the reference frequency in each horizontal period, by using the output signal of the first squaring circuit 6 and the output signal of the second integrating circuit 8, and outputs a signal corresponding to the difference.

The thresholding circuit 25A determines whether the frequency obtained by the frequency difference calculating circuit 9 is smaller than a predetermined value and outputs a signal RD indicating the result.

The frequency difference calculating circuit 9 and the thresholding circuit 25A form a discriminating circuit 61 for using the output signal of the first squaring circuit 6 and the output signal of the second integrating circuit 8 to discriminate whether the color subcarrier frequency differs from the reference frequency in each horizontal period.

The internal structure of each element of the frequency discrimination apparatus shown in FIG. 1 will be described in further detail with reference to FIGS. 2 to 5.

Figure 2:
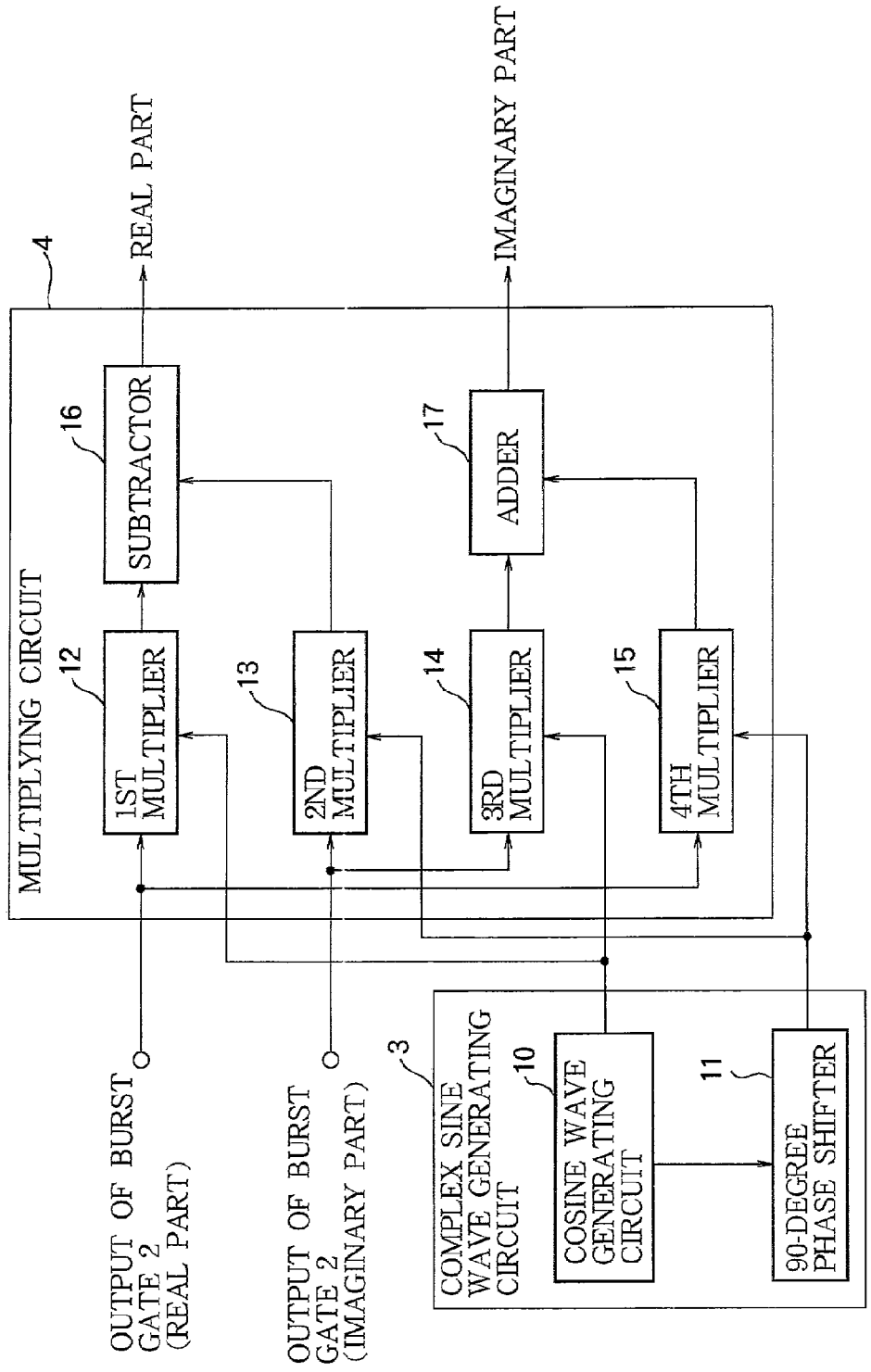
FIG. 2 is a block diagram showing the internal structure of the complex sine wave generating circuit 3 and multiplying circuit 4 used in the first embodiment of this invention.

FIG. 2 shows the internal structure of the complex sine wave generating circuit 3 and multiplying circuit 4. Let exp($-j2\pi ft$) be the complex sine wave signal generated by the complex sine wave generating circuit 3, where exp(x) is the x-th power of the base of the natural logarithms, j is the unit imaginary number, $\pi$ is the ratio of the circumference to the diameter of a circle, f is the frequency of the sine wave oscillation, and t is time. For simplicity, let $C=\cos(2\pi ft)$ and $S=\sin(2\pi ft)$, so that the complex sine wave signal generated by the complex sine wave generating circuit 3 is $C-jS$. It will also be assumed that the output signal of the burst gate 2 is complex-valued, expressed as $X+jY$. C, S, X, and Y are functions of time t. The output signal of the multiplying circuit 4 is then $(X+jY)\times(C-jS)$. The real part of this is $XC+YS$ and the imaginary part is $-XS+YC$.

To perform the multiplication described above, the complex sine wave generating circuit 3 includes a cosine wave generating circuit 10 for generating the signal expressed as C. A 90-degree phase shifter 11 generates the signal expressed as $-S$ by shifting the phase of the output signal of the cosine wave generating circuit 10 by 90 degrees. C, generated by the cosine wave generating circuit 10, and $-S$, generated by the 90-degree phase shifter 11, are output to the multiplying circuit 4. Being structured as described above, the complex sine wave generating circuit 3 can be thought of as outputting the real part and the imaginary part of the complex sine wave signal $C-jS$ separately. $-S$ may be generated by a circuit for generating a sine wave by the same procedure as used in the cosine wave generating circuit 10, instead of by shifting the phase of the output signal of the cosine wave generating circuit 10 by 90 degrees.

The multiplying circuit 4 takes the product of the complex signals $X+jY$ and $C-jS$. The multiplying circuit 4 has separate input terminals for real part X and imaginary part Y of the complex signal $X+jY$, and comprises four multipliers. The first multiplier 12 calculates XC; the second multiplier 13 calculates $-YS$; the third multiplier 14 calculates YC; and the fourth multiplier 15 calculates $-XS$. A subtractor 16 subtracts the output signal of the second multiplier 13 from the output signal of the first multiplier 12 to obtain $XC+YS$. An adder 17 adds the output signal of the first multiplier 12 and the output signal value of the second multiplier 13 to obtain $-XS+YC$. If the output signal of the subtractor 16 is regarded as the real part and if the output signal of the adder 17 is regarded as the imaginary part, the multiplying circuit 4 can be regarded as taking the product of the complex signal $X+jY$ and the complex sine wave generated by the complex sine wave generating circuit 3.

The output signal of the burst gate 2 was treated as a complex signal $X+jY$ in the discussion above, but if the imaginary part Y of the output signal of the burst gate 2 is zero, the output signal of the multiplying circuit 4 becomes $XC-jXS$. In that case, the circuit can be simplified because the second multiplier 13, third multiplier 14, subtractor 16, and adder 17 are unnecessary. The product of the output signal X of the burst gate 2 and the complex sine wave signal $C-jS$ is calculated by outputting the output signal XC of the first multiplier 12 as the real part and the output signal $-XS$ of the fourth multiplier 15 as the imaginary part.

It has been assumed that the complex sine wave generating circuit 3 generates C and $-S$, but the complex sine wave generating circuit 3 may generate C and S. Even in that case, it can be easily understood that the real part $XC+YS$ and the imaginary part $-XS+YC$ of the product of the complex signals X+jY and C−jS are obtained through appropriate addition and subtraction (by using an adder instead of the subtractor 16 and using a subtractor instead of the adder 17). This also applies if Y is always zero.

Figure 3:
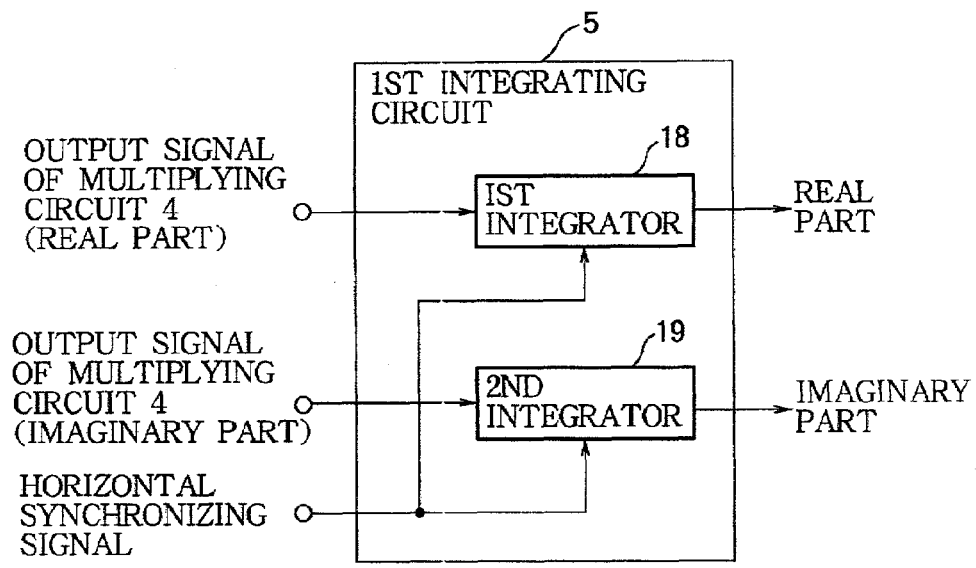
FIG. 3 is a block diagram showing the internal structure of the first integrating circuit 5 used in the first embodiment of this invention.

FIG. 3 is a block diagram showing the internal structure of the first integrating circuit 5. The first integrating circuit 5 is a circuit that integrates the output signal of the multiplying circuit 4 over one horizontal period. Because the output signal of the multiplying circuit 4 is a complex signal, a first integrator 18 for integrating the real part of the output signal of the multiplying circuit 4 in the time direction and a second integrator 19 for integrating the imaginary part of the output signals of the multiplying circuit 4 in the time direction are provided. The first integrator 18 and second integrator 19 are reset to zero after outputting the integrated values each time the reference edge of the horizontal synchronizing signal is input. The integrated values (the values immediately before the reset) of the first integrator 18 and the second integrator 19 are output to the first squaring circuit in the next stage.

Figure 4:
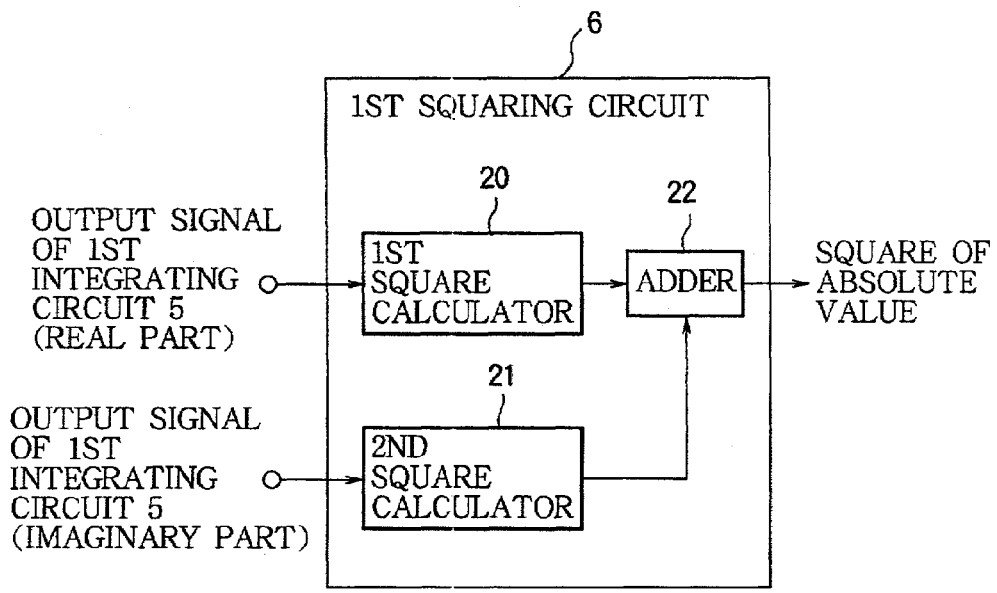
FIG. 4 is a block diagram showing the internal structure of the first squaring circuit 6 used in the first embodiment of this invention.

FIG. 4 is a block diagram showing the internal structure of the first squaring circuit 6. The first squaring circuit 6 is a circuit that takes the square of the absolute value of the complex signal provided as the output signal of the first integrating circuit 5. If the real part and the imaginary part of the output signal of the first integrating circuit 5 are expressed as P and Q, respectively, the output signal of the first squaring circuit 6 is $P^2+Q^2$. Let $x^y$ denote the y-th power of x, where x and y are arbitrary quantities. Among the circuits in the first squaring circuit 6, the first square calculator 20 is a circuit for obtaining $P^2$; the second square calculator 21 is a circuit for obtaining $Q^2$; the adder 22 is a circuit for obtaining $P^2+Q^2$ by adding the output signal of the first square calculator 20 and the output signal of the second square calculator 21. The output signal of the adder 22 is output, as the output signal of the first squaring circuit 6, to the frequency difference calculating circuit 9 in the next stage.

The second squaring circuit 7 is a circuit for taking the square of the absolute value of the output signal (instantaneous amplitude) of the burst gate 2. If the imaginary part Y of the output signal X+jY of the burst gate 2 is always zero, only $X^2$ needs to be obtained, so the second squaring circuit 7 can be structured as a simple multiplier. If the imaginary part Y is not always zero, the output of the second squaring circuit 7 is $X^2+Y^2$, and the internal structure is the same as the internal structure of the first squaring circuit 6 shown in FIG. 4.

The second integrating circuit 8 is a circuit that integrates the output signal of the second squaring circuit 7 over one horizontal period. Since the output signal of the second squaring circuit 7 does not have an imaginary part, the second integrating circuit 8 can be implemented with the same structure as the first integrator 18 (FIG. 3) in the first integrating circuit 5.

Figure 5:
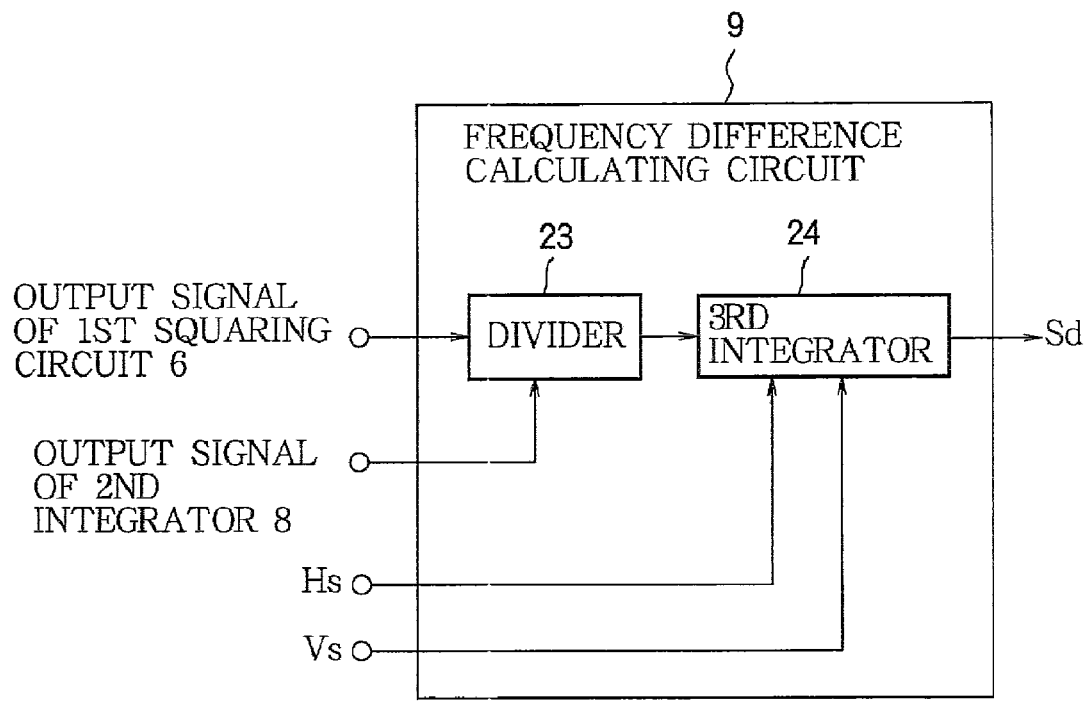
FIG. 5 is a block diagram showing the internal structure of the frequency difference calculating circuit 9 used in the first embodiment of this invention.

FIG. 5 is a block diagram showing the internal structure of the frequency difference calculating circuit 9. A divider 23 divides the output signal of the first squaring circuit 6 by the output signal of the second integrating circuit 8. As will be explained later, the result of division by the divider 23 is a value Sd corresponding to a difference d between the oscillation frequency f of the complex sine wave and the color subcarrier frequency F. The third integrator 24 is a circuit that resets the integrated value to zero each time the reference edge of the vertical synchronizing signal is detected and adds the result of division by the divider 23 to the current integrated value each time the reference edge of the horizontal synchronizing signal is detected.

The thresholding circuit 25A is a circuit that outputs a high signal when the output signal of the frequency difference calculating circuit 9, or the integrated value provided as the output signal of the third integrator 24, is greater than a certain threshold value, and outputs a low signal otherwise.

The output signal RD of the thresholding circuit 25A is a signal indicating the result of frequency discrimination by the discriminating circuit 61. If the output signal of the thresholding circuit 25A (the output signal of the discriminating circuit 61) is high, this indicates that there is little difference between the oscillation frequency f of the complex sine wave and the color subcarrier frequency. A low output signal indicates that there is a great difference between the oscillation frequency f of the complex sine wave and the color subcarrier frequency.

Among the circuits described with reference to FIGS. 1 to 5, the part up to the frequency difference calculating circuit 9 forms a frequency difference detection apparatus for detecting the frequency difference between the color subcarrier frequency of the input video signal and the reference frequency, and the part up to the thresholding circuit 25A forms a frequency discrimination apparatus. The direct current rejection circuit 1 and burst gate 2 may be regarded as part of the frequency difference detection apparatus, or as part of the frequency discrimination apparatus, or as part of neither apparatus.

As will be explained later in detail, the output of the frequency difference detection apparatus (output of the frequency difference calculating circuit 9) is a signal having a value corresponding to the difference between the color subcarrier frequency of the input video signal and the reference frequency, and the thresholding circuit 25A can determine whether the frequency difference is great, or more specifically whether the subcarrier frequency of the input video signal is 3.58 MHz or 4.43 MHz, through comparison with a certain value. This feature will now be described in detail.

If A is the amplitude of the color burst signal, F is the frequency of the color burst signal, and θ is the phase difference between the color burst signal and the complex sine wave, then the color burst signal X extracted by the direct current rejection circuit 1 and burst gate 2 is expressed as follows:

$$X=A\sin(2\pi ft+\theta)$$

A, which indicates the envelope of the color burst signal, is actually a function of the time t, but to simplify the explanation, it will be assumed below that A is a constant that does not depend on time.

Since the complex sine wave generated by the complex sine wave generating circuit 3 was C−jS, if we write F−f=d and F+f=D, the real part of the signal output from the multiplying circuit 4 is $$XC=(A/2)\times\{\sin(2\pi Dt+\theta)+\sin(2\pi Dt+\theta)\}$$

and the complex part is $$-XS=(A/2)\times\{\cos(2\pi Dt+\theta)-\cos(2\pi Dt+\theta)\}.$$

It will be appreciated from the above that both the real and complex parts of the output signal of the multiplying circuit 4 are expressed as the sum (or difference) of a sine wave (or cosine wave) oscillation with a (comparatively) high frequency D and a sine wave (or cosine wave) oscillation with a (comparatively) low frequency d. If it is assumed in particular that F=f, then d=0 and D=2f, so the real part XC is $$XC=(A/2)\times\{\sin(4\pi ft+\theta)+\sin(\theta)\}$$

and the complex part −XS is $$-XS=(A/2)\times\{\cos(4\pi ft+\theta)+\cos(\theta)\}$$

Figure 6A:
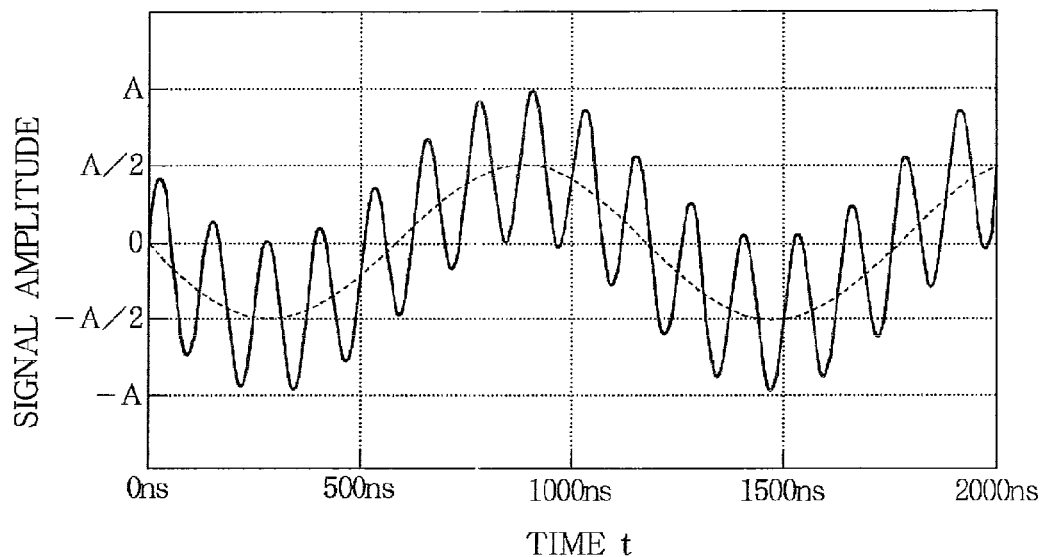
FIGS. 6(*a*) and 6(*b*) are waveform diagrams showing the waveform of the signal output from the multiplying circuit 4 when the frequency of the input signal differs from the reference frequency.
Figure 6B:
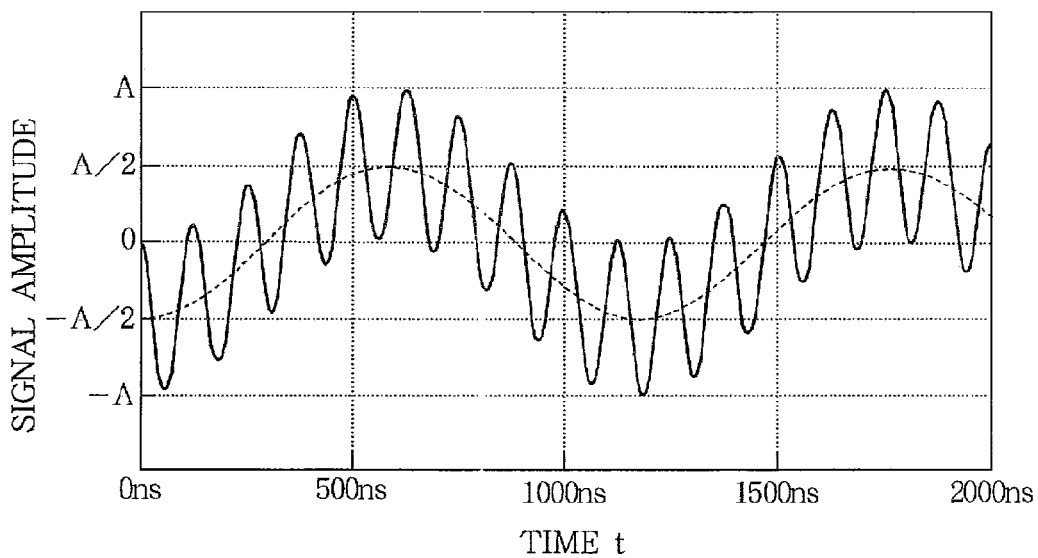
Figure 7:
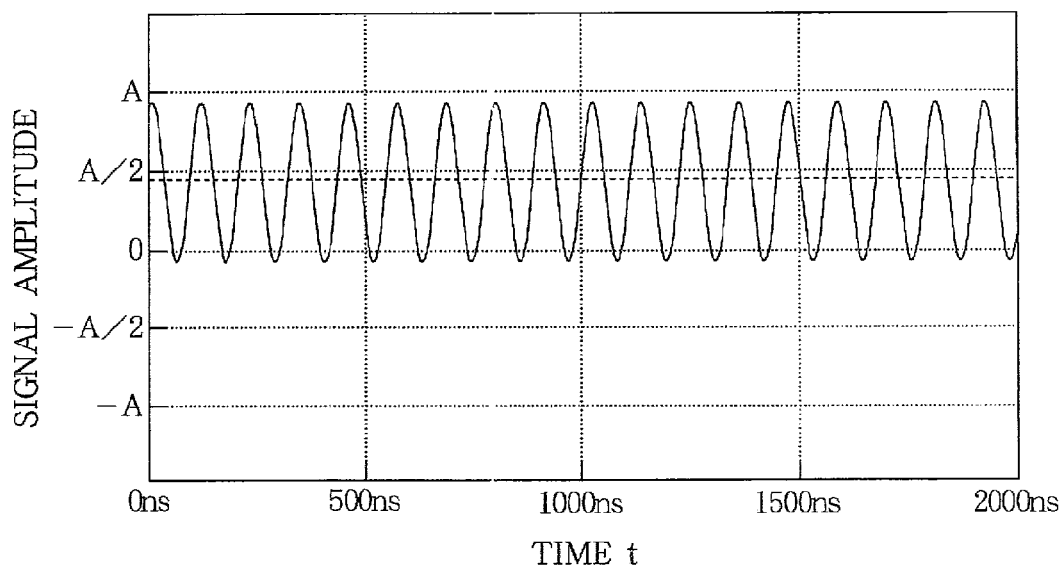
FIGS. 7(*a*) and 7(*b*) are waveform diagrams showing the waveform of the signal output from the multiplying circuit 4 when the frequency of the input signal is equal to the reference frequency.
Figure 7:
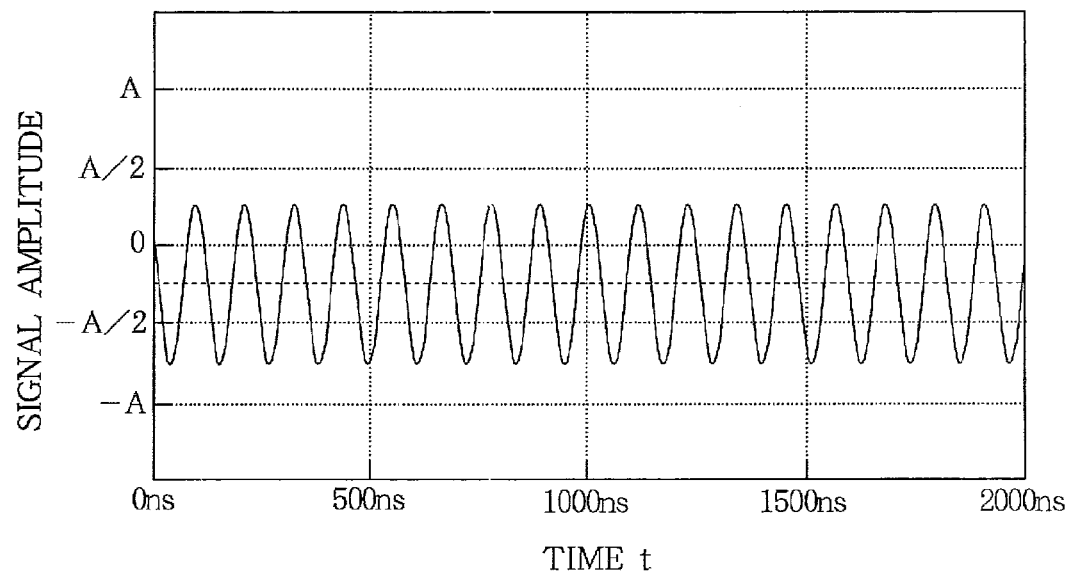

FIG. 6(a) shows the waveform of XC and FIG. 6(b) shows the waveform of −XS when F=3.58, f=4.43, and θ=0. Similarly, FIG. 7(a) shows the waveform of XC and FIG. 7(b) shows the waveform of −XS when F=f=4.43, and θ=π/3. In FIGS. 6(a), 6(b), 7(a), and 7(b), among the frequency components included in the output signal of the multiplying circuit 4, the component with frequency d is shown by a dotted line. When F=f, the component with frequency d is a direct current component, as can be seen from FIGS. 7(a) and 7(b).

The first integrating circuit 5 integrates the output signal of the multiplying circuit 4 over one horizontal period. The integration is done with respect to the color burst signal extracted by the burst gate 2, that is the integration takes place in the part of the horizontal period in which the color burst signal is actually present. This period will be denoted T, and the particular case in which T=2000 ns will be considered below. Among the frequency components included in the output signal of the multiplying circuit 4, each time a high frequency component with a frequency D is integrated over a period 1/D equivalent to one cycle, the integrated value becomes zero. If T is sufficiently large in comparison with 1/D, the component with frequency D will have substantially no effect on the result of integration by the first integrating circuit 5. This indicates that the result of integration by the first integrating circuit 5 depends only on the low frequency component with frequency d. If F differs greatly from f, T will be sufficiently large in comparison with 1/d that the result of integration by the first integrating circuit 5 will approach zero. If F and f are nearly equal, however, the component with frequency d can be regarded as a substantially direct current, so that the result P of integration of XC approaches $$P=(AT/2)\sin(\theta)$$

and the result Q of integration of −XS approaches $$Q=-(AT/2)\cos(\theta)$$

Figure 8:
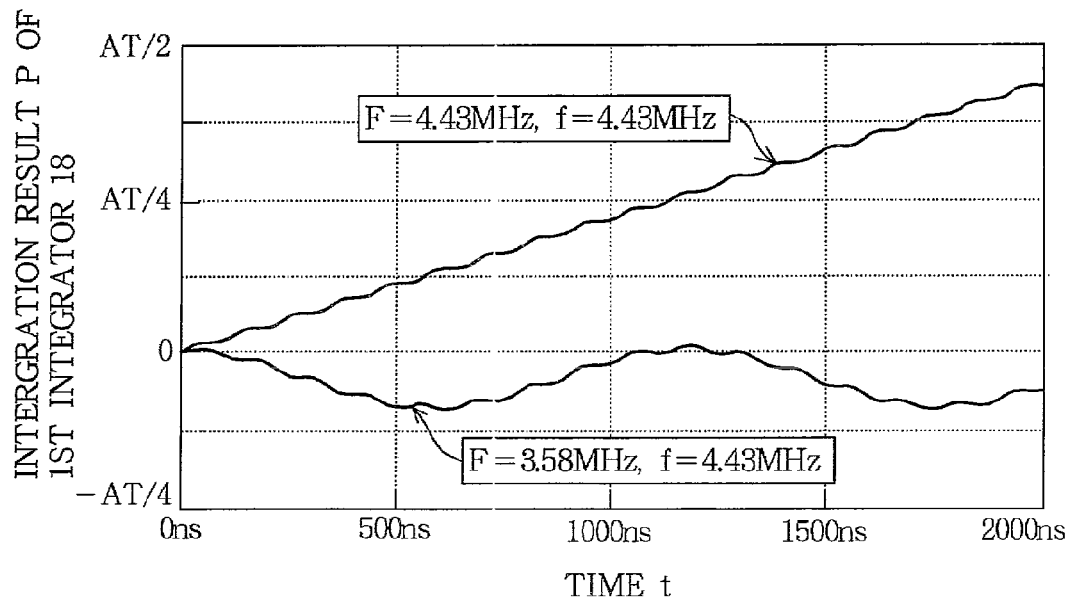
FIG. 8 is a diagram illustrating output levels of the first integrator 18.

FIG. 8 shows the results of integration of the waveform shown in FIG. 6(a) and integration of the waveform shown in FIG. 7(a) in the time direction. From FIG. 8 it can be seen that the result of integration when F=3.58 MHz and f=4.43 MHz is closer to zero than the result when F=f=4.43 MHz.

Figure 9:
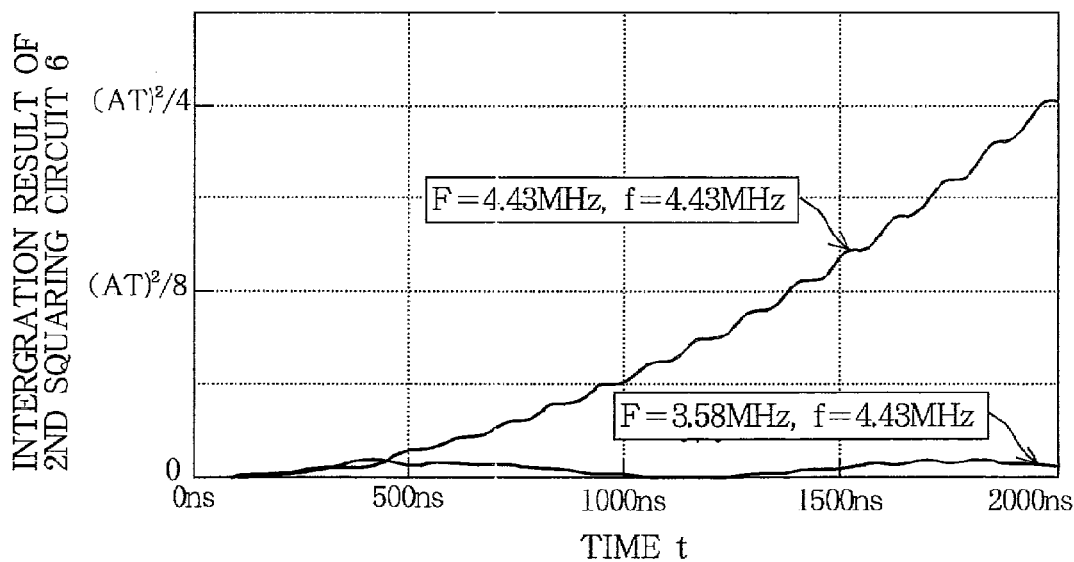
FIG. 9 is a diagram illustrating output levels of the first squaring circuit 6.

The first squaring circuit 6 is a circuit for calculating $P^2+Q^2$. If F=f, $$P^2+Q^2=(AT/2)^2$$

and the output of the first squaring circuit does not depend on the phase difference θ between the color burst signal and the complex sine wave. If F differs greatly from f, the integration results P and Q approach zero, and consequently the result obtained by the first squaring circuit 6 also approaches zero. FIG. 9 shows different results obtained by the first squaring circuit 6 when F=3.58, f=4.43, θ=0 and when F=f=4.43, θ=π/3. From FIG. 9, it can be seen that the former result is much smaller than the latter one.

The color burst signal is input to the second squaring circuit 7 as well. The second squaring circuit 7 calculates $$X^2=(A^2)\times\{1-\cos(4\pi Ft+2\theta)\}/2$$

The output signal of the second squaring circuit 7 includes a direct current component proportional to the square of A and a component of frequency 2F, twice the color subcarrier frequency. When the output of the second squaring circuit 7 is integrated by the second integrating circuit 8 in the time direction, if T is sufficiently longer than 1/(2F), the result obtained by integrating the 2F frequency component is substantially zero, and the second integrating circuit 8 produces $(A^2)T/2$ as its integration result. Because the result of integration by the second integrating circuit 8 does not depend on the color subcarrier frequency F, the same result can be obtained with F=3.58 MHz or with F=4.43 MHz.

Accordingly, if the output signal of the first squaring circuit 6 is divided by the output signal of the second integrating circuit 8 in the divider 23 in the frequency difference calculating circuit 9, T/2 is obtained when F=f, and the result approaches zero as the difference between F and f increases. Similarly, the output signal of the third integrator 24 for integrating the result of division by the divider 23 over one vertical period increases as the difference between F and f decreases, and approaches zero as the difference between F and f increases. Therefore, if the thresholding circuit 25A thresholds the output signal of the third integrator 24 at the timing at which the reference edge of the vertical synchronizing signal is detected, it can be determined whether the color subcarrier frequency of the input video signal is 3.58 MHz or 4.45 MHz. An appropriate threshold value for the thresholding circuit 25A should be selected in consideration of the pulse width of the pulse gate pulse BGP.

Suppose that the color burst signal includes noise. First, consider a case in which the color subcarrier frequency F is approximately equal to the oscillation frequency f of the complex sine wave and the noise frequency differs greatly from f. When the difference between F and f is great, the result of integration by the first integrating circuit 5 approaches zero, as noted above. Similarly, when the difference between the noise frequency and f is great, the noise component has little effect on the result of integration by the first integrating circuit 5. When noise is present, the result of integration by the second integrating circuit 8 becomes slightly larger than the result without noise, but not so much larger as to make it impossible to discriminate between the result when F=f=4.43 MHz and the result when F=3.58 MHz and f=4.43 MHz. Therefore, the result of frequency calculation by the frequency difference calculating circuit 9 and the result of frequency discrimination by the discriminating circuit 61 can be said to be substantially immune to noise.

Next, consider a case in which F differs greatly from f and the color burst signal includes noise. The result of integration of signals having an amplitude A and an arbitrary frequency by the second integrating circuit 8 is $(A^2)T/2$ as described above (if noise is not included). The square of the signal amplitude is a value corresponding to the signal power, and the signal power multiplied by time gives a value corresponding to the signal energy (energy multiplied by ½). Accordingly, the second squaring circuit 7 and the second integrating circuit 8 can be considered to calculate a value corresponding to the total energy of the output signal of the burst gate 2. Similarly, the output $(AT/2)^2$ from the first squaring circuit 6 can be regarded as a value corresponding to a value obtained by multiplying the energy of a signal having frequency f by time T (the above multiplied value further multiplied by ¼). Because noise is not usually concentrated at a particular frequency, it can be assumed that the energy of the noise component having frequency f is quite small in comparison with the total noise energy. Accordingly, the value of the divider 23 can be assumed to approach zero, so that the result of the frequency difference calculation by the frequency difference calculating circuit 9 and the frequency discrimination result obtained by the discriminating circuit 61 are substantially immune to noise.

The above description shows that frequency discrimination is possible if the imaginary part Y of the output signal of the burst gate 2 is always zero. Frequency discrimination is also possible when the output signal of the burst gate 2 is a complex signal (Y≠0). In the description given above, the output signal of the burst gate 2 has been a sine wave signal, but the signal may be a cyclic signal with any waveform. For example, frequency discrimination of a rectangular wave or a triangular wave is possible.

In the first embodiment, the oscillation frequency of the complex sine wave generated by the complex sine wave generating circuit 3 was 4.43 MHz, but substantially the same result is obtained with the oscillation frequency of the complex sine wave set to an arbitrary value close to 4.43 MHz. The oscillation frequency of the complex sine wave may also be 3.58 MHz or an arbitrary value close to 3.58 MHz. In that case, the output signal of the thresholding circuit 25A goes high when F=3.58 MHz and goes low when F=4.43 MHz.

Thus if it is known in advance that the frequency of the color burst signal of the input composite video signal Vc has one of two values, discrimination can be carried out by setting one of the two values or a value close to it.

In the first embodiment, the complex sine wave generated by the complex sine wave generating circuit 3 has an amplitude of unity, but the complex sine wave may have any amplitude. In particular, the sine wave and the cosine wave constituting the complex sine wave may have different amplitudes.

The first embodiment discriminated between two frequencies, 3.58 MHz and 4.43 MHz, but the number of frequencies to be discriminated may be three or more. For example, it is possible to discriminate among ten different frequencies from F0 to F9. This can be done, for example, by switching the oscillation frequency of the complex sine wave generated by the complex sine wave generating circuit 3 successively from F0 to F9 until the output signal of the thresholding circuit 25A goes high.

In the first embodiment, the integration results obtained by the first integrating circuit 5 and the second integrating circuit 8 are reset to zero once per horizontal period, but the integration period may be arbitrary. If, for example, the integration result is reset to zero once per vertical period, frequency difference detection or frequency discrimination can be performed in the same manner by omitting the third integrator 24 in the frequency difference calculating circuit 9 and providing the output of the divider 23 directly to the thresholding circuit 25A as the output of the frequency difference calculating circuit 9.

In the first embodiment, the output signal of the multiplying circuit 4 is used as the input signal of the first integrating circuit 5, but a low-pass filter having a stop-band at frequency D may be interposed between the multiplying circuit 4 and the first integrating circuit 5. In that case, the product of the color burst signal and the complex sine wave can be considered to be integrated by the combination of the low-pass filter having a stop-band at frequency D and the first integrating circuit to generate the integration result.

Second Embodiment

Figure 10:
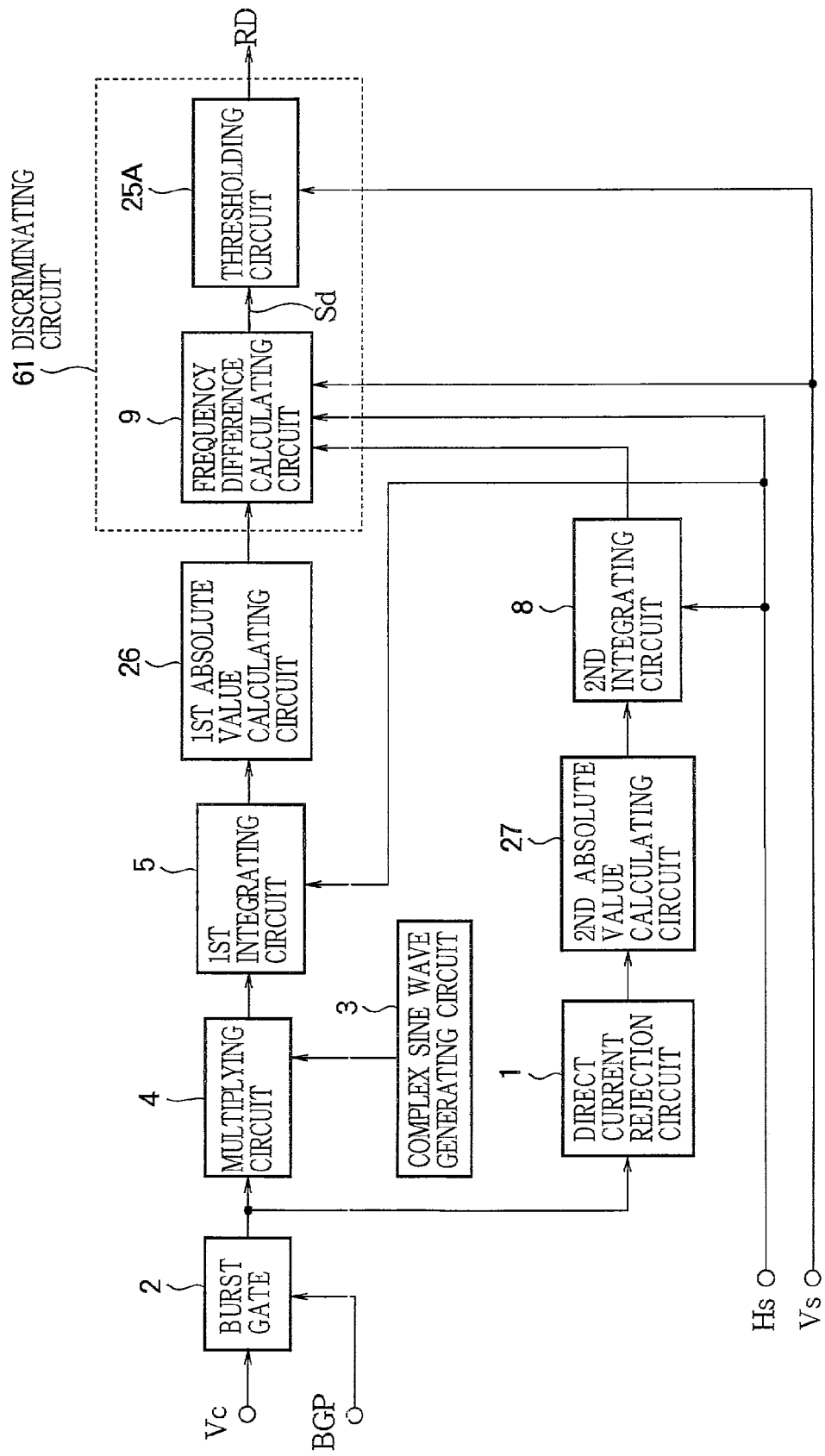
FIG. 10 is a block diagram showing the overall structure of the frequency discrimination apparatus in a second embodiment of this invention.

FIG. 10 shows the structure of the frequency discrimination apparatus in a second embodiment of this invention and a frequency difference detection apparatus forming a part thereof. Reference characters in FIG. 10 that are the same as in FIG. 1 indicate the same or similar elements.

The second embodiment differs from the first embodiment in that the first squaring circuit 6 and second squaring circuit 7 of the first embodiment are replaced by a first absolute value calculating circuit 26 and a second absolute value calculating circuit 27, and the direct current rejection circuit 1 is disposed between the burst gate 2 and the second absolute value calculating circuit 27.

In the first embodiment, the direct current rejection circuit 1 preceded the burst gate 2, but the direct current rejection circuit 1 may be disposed between the burst gate 2 and the second absolute value calculating circuit 27. The oscillation frequency f of the complex sine wave generated by the complex sine wave generating circuit 3 is normally sufficiently large in comparison with direct current (zero frequency) that the direct current component, if any, remaining in the output signal of the burst gate 2 has little effect on the result of integration by the first integrating circuit 5.

Figure 11:
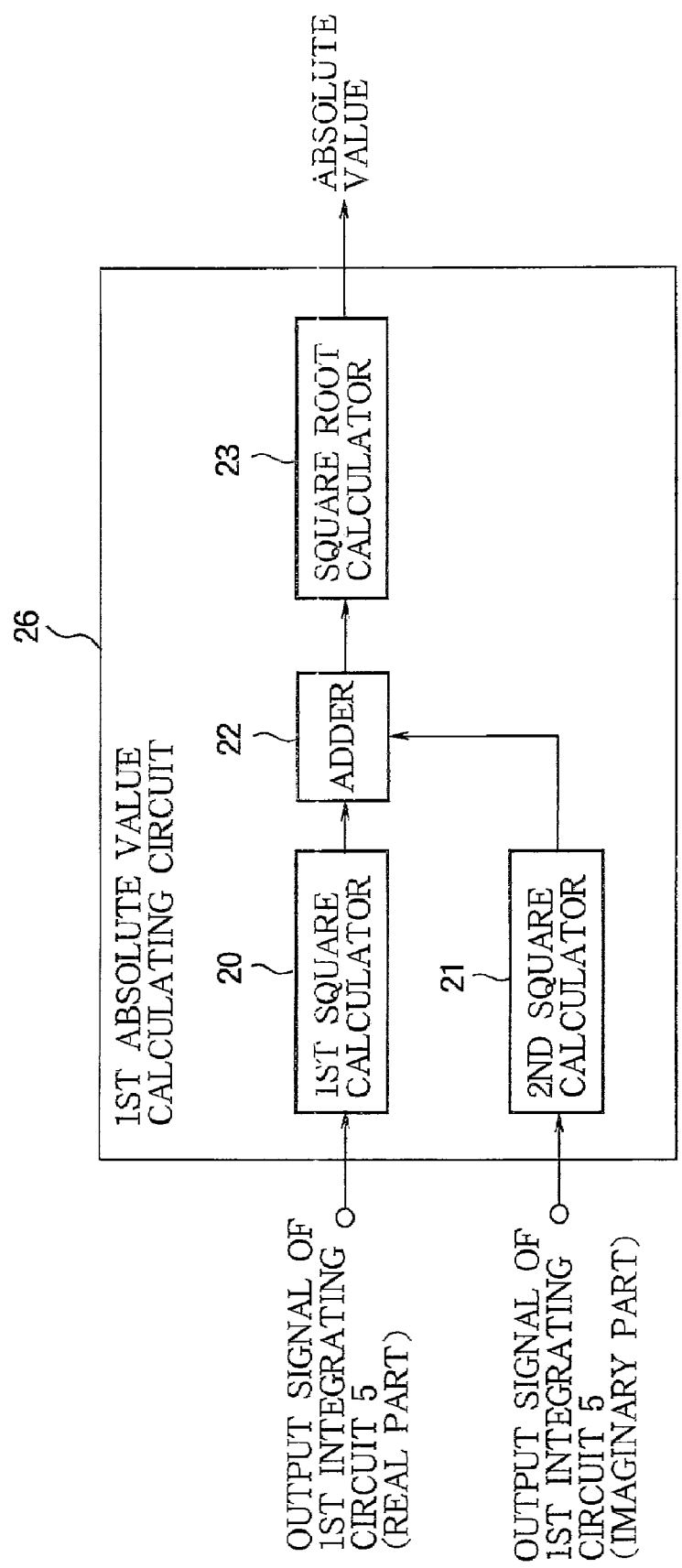
FIG. 11 is a block diagram showing the internal structure of the first absolute value calculating circuit 26 used in the second embodiment of this invention.

FIG. 11 shows the internal structure of the first absolute value calculating circuit 26. The structure is the same as the structure of the first squaring circuit 6 shown in FIG. 4, except that a square root calculator 28 is added. The square root calculator 28 is a circuit for taking the square root of the output signal of the adder 22. As described in the first embodiment, the output signal of the adder 22 is $(AT/2)^2$ when F=f, so the output signal of the square root calculator 28 is AT/2 when F=f.

The second absolute value calculating circuit 27 is a circuit that takes the absolute value of the output signal of the direct current rejection circuit 1. If the output signal of the direct current rejection circuit 1 is a complex signal, the internal structure of the second absolute value calculating circuit 27 is the same as the internal structure of the first absolute value calculating circuit 26. If the imaginary part of the output signal of the direct current rejection circuit 1 is always zero, the second absolute value calculating circuit 27 performs the same calculation as in the calculation of the absolute value of a real number. That is, the output signal of the direct current rejection circuit 1 passes through unchanged if its signal level is greater than or equal to zero, and if the signal level is less than zero, the sign of the signal is inverted wen the signal is output to the second integrating circuit 8, so that it becomes greater than zero. Since the result obtained by the second absolute value calculating circuit 27 differs depending on the magnitude of the direct current component, when the frequency difference between f and a non-direct-current frequency F is determined, the direct current component needs to be removed beforehand.

If the output signal of the direct current rejection circuit 1 is $A \sin(2\pi Ft+\theta)$, the output signal of the second integrating circuit 8 is nearly $2AT/\pi$, regardless of the color subcarrier frequency F. Accordingly, the output signal of the divider 23 in the frequency difference calculating circuit 9 is $4/\pi$ when F=f and approaches zero as the difference between F and f increases.

Although the output signal of the divider 23 depends on T in the first embodiment, the output signal of the divider 23 in the second embodiment is independent of T. Usually, the color burst signal is present in part of the period in which the burst gate pulse BGP is active, and the value of T indicates the period in which the color burst signal is present while the burst gate pulse BGP is active. Because the period in which the color burst signal is present is not always constant, strictly speaking, the threshold value must be changed in accordance with the value of T in the first embodiment. In the second embodiment, however, the frequency discrimination result is not affected by a change in the value of T.

The first squaring circuit 6 and second squaring circuit 7 shown in FIG. 1 can be used instead of the first absolute value calculating circuit 26 and second absolute value calculating circuit 27 in the frequency difference calculation circuit shown in FIG. 10.

The first absolute value calculating circuit 26 and second absolute value calculating circuit 27 shown in FIG. 10 can be used instead of the first squaring circuit 6 and second squaring circuit 7 in the frequency difference calculation circuit shown in FIG. 1.

In the circuit shown in FIG. 10, the part up to the frequency difference calculating circuit 9 forms a frequency difference detection apparatus, and the part up to the thresholding circuit 25A forms a frequency discrimination apparatus.

Third Embodiment

Figure 12:
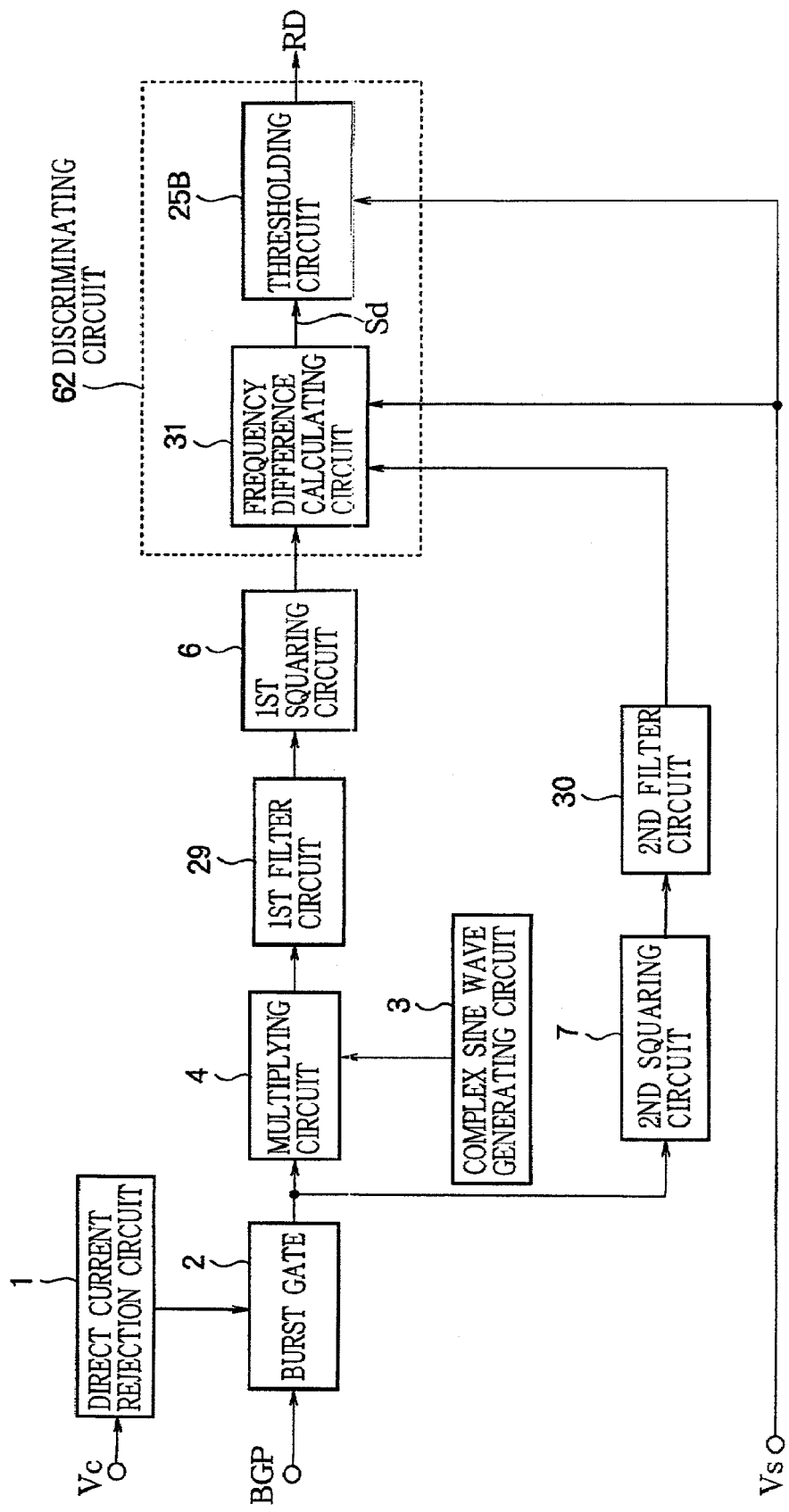
FIG. 12 is a block diagram showing the overall structure of the frequency discrimination apparatus in a third embodiment of this invention.

FIG. 12 shows the structure of the frequency discrimination apparatus in a third embodiment of this invention and a frequency difference detection apparatus forming a part thereof. Reference characters in FIG. 12 that are the same as in FIG. 1 indicate the same or similar elements.

In the third exemplary embodiment, the first integrating circuit 5 of the first embodiment is replaced by a first filter circuit 29, the second integrating circuit 8 is replaced by a second filter circuit 30, and a frequency difference calculating circuit 31 and thresholding circuit 25B are used that differ in their internal structure from the frequency difference calculating circuit 9 and thresholding circuit 25A in the first embodiment.

Figure 13:
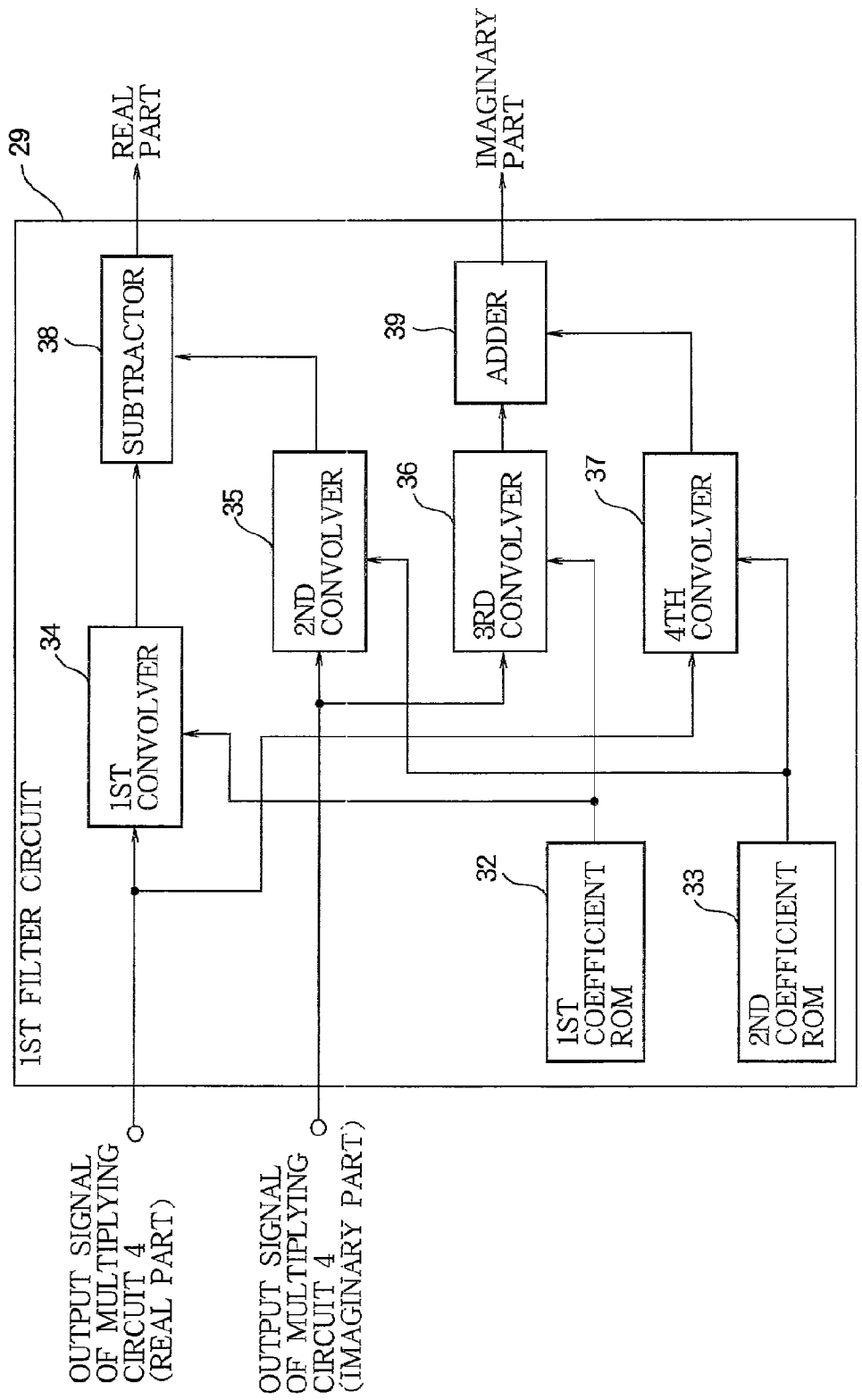
FIG. 13 is a block diagram showing the internal structure of the first filter circuit 29 used in the third embodiment of this invention.

FIG. 13 is a block diagram showing the internal structure of the first filter circuit 29. The first coefficient ROM 32 in the drawing is a circuit for storing the real-valued tap coefficients of the filter, and the second coefficient ROM 33 is a circuit for storing the imaginary-valued tap coefficients of the filter. The first convolver 34 is a circuit that convolves the real part of the output signal of the multiplying circuit 4 with the real-valued tap coefficients stored in the first coefficient ROM 32. Similarly, the second convolver 35 convolves the imaginary part of the output signal of the multiplying circuit 4 with the imaginary-valued tap coefficients stored in the second coefficient ROM 33, the third convolver 36 convolves the imaginary part of the output signal of the multiplying circuit 4 with the real-valued tap coefficients stored in the first coefficient ROM 32, and the fourth convolver 37 convolves the real part of the output signal of the multiplying circuit 4 with the imaginary-valued tap coefficients stored in the second coefficient ROM 33. The subtractor 38 is a circuit that subtracts the result obtained by the second convolver 35 from the result obtained by the first convolver 34, and the adder 39 is a circuit that adds the result obtained by the third convolver 36 and the result obtained by the fourth convolver 37. The result obtained by the subtractor 38 expresses the real part of the output signal of the first filter circuit 29, and the result obtained by the adder 39 expresses the imaginary part of the output signal of the second filter circuit 30. If the first filter circuit 29 has just real-valued tap coefficients, the second coefficient ROM 33, second convolver 35, fourth convolver 37, subtractor 38, and adder 39 are unnecessary: the result obtained by the first convolver 34 may be regarded as the real part of the output signal of the first filter circuit 29, and the result obtained by the third convolver 36 may be regarded as the imaginary part of the output signal of the first filter circuit 29. If the first filter circuit 29 is structured as an analog circuit, the first coefficient ROM 32 and second coefficient ROM 33 are unnecessary, and the first convolver 34, second convolver 35, third convolver 36, and fourth convolver 37 may comprise circuit elements such as resistors, capacitors, and coils.

The second filter circuit 30 is a filter for removing high frequency components from the output signal of the second squaring circuit 7. The output signal of the second squaring circuit 7 is always a real number, and the output signal of the second filter circuit 30 is also a real number. Therefore, the second filter circuit 30 can be structured from circuits corresponding to the first coefficient ROM 32 and first convolver 34.

Figure 14:
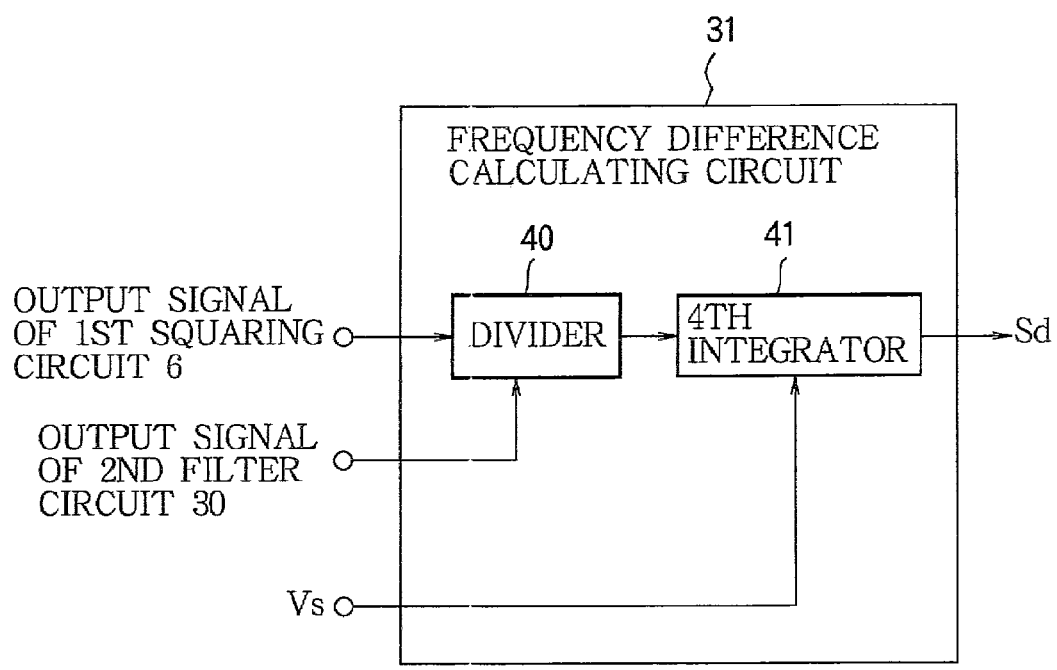
FIG. 14 is a block diagram showing the internal structure of the frequency difference calculating circuit 31 used in the third embodiment of this invention.

FIG. 14 is a block diagram showing the internal structure of the frequency difference calculating circuit 31. The divider 40 is a circuit that divides the output signal of the first squaring circuit 6 by the output signal of the second filter circuit 30. The division is performed only on the color burst signal that has passed the burst gate 2. The fourth integrator 41 is a circuit that integrates the output signal of the divider 40 in the time direction. The integrated value of the fourth integrator 41 is reset to zero each time the reference edge of the vertical synchronizing signal is detected.

The thresholding circuit 25B connected following the frequency difference calculating circuit 31 differs from the thresholding circuit 25A shown in FIG. 5 in that it outputs a signal RD indicating the result of discrimination by indicating that the frequency difference is small when its input signal Sd is smaller than a certain value. That is, the output of the thresholding circuit 25B goes high if the output signal of the fourth integrator 41 is greater than or equal to a certain threshold value when the reference edge of the vertical horizontal signal is detected, and goes low otherwise.

The frequency difference calculating circuit 31 and thresholding circuit 25B form a discriminating circuit 62.

Among the circuits described with reference to FIG. 12 to FIG. 14, the part up to the frequency difference calculating circuit 31 forms a frequency difference detection apparatus, and the part up to the thresholding circuit 25B forms a frequency discrimination apparatus.

As will be described later in detail, the output of the frequency difference detection apparatus (the output of the frequency difference calculating circuit 31) is a signal having a value corresponding to the difference between the reference frequency and the color subcarrier frequency of the input video signal; whether the frequency difference is large, or more specifically, whether the color subcarrier frequency of the input video signal is 3.58 MHz or 4.43 MHz, can be determined by a comparison of this value with a predetermined value; this comparison is performed in the thresholding circuit 25B. This feature will now be described in further detail.

The first filter circuit 29 is structured to have different gains at frequencies corresponding to the sum D (=F+f) and difference d (=F−f) of the frequency F of the input signal and the reference frequency f. Suppose, for example, that the first filter circuit 29 has a low-pass filter characteristic. If the first filter circuit 29 has a gain of zero at the frequency D=F+f and a gain G at the frequency d=F−f, then the real part P of the output signal of the first filter circuit 29 is $$P=(AG/2)\times\sin(2\pi dt+\theta)$$

and the imaginary part Q is $$Q=-(AG/2)\times\cos(2\pi dt+\theta)$$

Then, the output signal of the first squaring circuit 6 becomes $$P^2+Q^2=(AG/2)^2$$

The gain of the second filter circuit 30 at direct current is large in relation to the gain at a frequency equivalent to twice the frequency of the input signal. If the gain of the second filter circuit 30 is zero at frequency 2F and unity at direct current, for example, then the output signal of the second filter circuit 30 is $(A^2)/2$. The output signal of the divider 40 is therefore $(G^2)/2$. If the characteristic of the first filter circuit 29 is determined so that the gain G decreases as the value of d deviates from zero, the output signal of the divider 40 becomes a value expressing the frequency difference between F and f, and the output signal of the fourth integrator 41 obtained by integrating this value over one vertical period also becomes a value expressing the frequency difference between F and f.

The thresholding circuit 25B is a circuit that outputs a high signal when the output signal of the frequency difference calculating circuit 31, or the integrated value Ed provided as the output signal of the fourth integrator 41, is greater than or equal to a certain threshold value, and outputs a low signal otherwise. The output signal RD of the thresholding circuit 25B is a signal indicating the result of frequency discrimination. If the output signal RD of the thresholding circuit 25B is high, it indicates that there is little difference between the oscillation frequency f of the complex sine wave and the color subcarrier frequency. If the output signal is low, the difference between the oscillation frequency f of the complex sine wave and the color subcarrier frequency is large.

The frequency discrimination apparatus of the third embodiment performs frequency discrimination in the same way as in the first embodiment.

The first filter circuit 29 may have a band-pass or high-pass filter characteristic. Suppose that the gain of the first filter circuit 29 is G at frequency D and zero at frequency d. In that case, the real part P of the output signal of the first filter circuit 29 is $$P=(AG/2)\times\sin(2\pi Dt+\theta)$$

and the imaginary part Q is $$Q=(AG/2)\times\cos(2\pi Dt+\theta)$$

Therefore, the output signal of the first squaring circuit 6 is $(AG/2)^2$. If the first filter circuit 29 has a band-pass filter characteristics such that the value of G is maximized at the frequency 2f and decreases as the frequency deviates from 2f, the result will be identical to the result obtained with a low-pass filter characteristic.

The first absolute value calculating circuit 26 and second absolute value calculating circuit 27 shown in FIG. 10 can be used in place of the first squaring circuit 6 and second squaring circuit 7 in the frequency difference calculating circuit 31 shown in FIG. 12.

Fourth Embodiment

Figure 15:
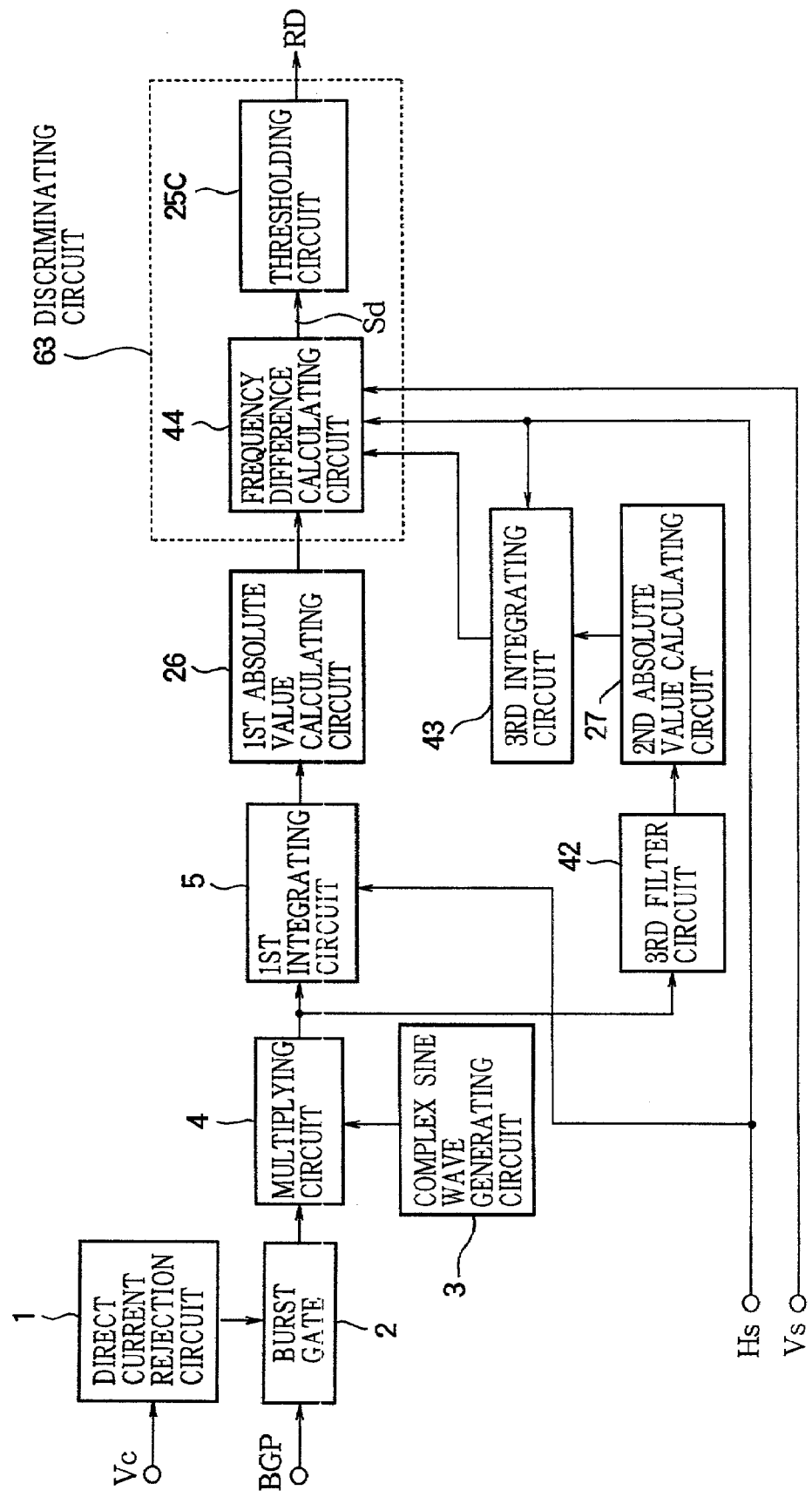
FIG. 15 is a block diagram showing the overall structure of the frequency discrimination apparatus in a fourth embodiment of this invention.

FIG. 15 shows the structure of the frequency discrimination apparatus in a fourth embodiment of this invention and a frequency difference detection apparatus forming a part thereof. Reference characters in FIG. 15 that are the same as in FIG. 1 indicate the same or similar elements.

The fourth embodiment differs greatly from the first embodiment in that the output signal of the multiplying circuit 4 is input to a third filter circuit 42 as well as the first integrating circuit 5. The internal structures and interconnections of the direct current rejection circuit 1, burst gate 2, complex sine wave generating circuit 3, multiplying circuit 4, and first integrating circuit 5 are the same as in the first embodiment. The output signal of the first integrating circuit 5 is input to a first absolute value calculating circuit 26, which was described in the second embodiment. The third filter circuit 42 is a circuit that removes high frequency components from the output signal of the multiplying circuit 4. The internal structure of the third filter circuit 42 is the same as the internal structure of the first filter circuit 29 shown in FIG. 13. The second absolute value calculating circuit 27 finds the absolute value of the complex output signal of the third filter circuit 42, and the third integrating circuit 43 integrates the output signal of the second absolute value calculating circuit 27 in the time direction.

The frequency difference calculating circuit 44 finds the difference between the color subcarrier frequency of the input video signal and the reference frequency by using the output signal of the first integrating circuit 5 and the output signal of the third integrating circuit 43, and outputs a signal corresponding to the difference.

The thresholding circuit 25C determines whether the frequency difference obtained by the frequency difference calculating circuit 44 is smaller than a predetermined value and outputs a signal RD indicating the result of this determination.

The frequency difference calculating circuit 44 and thresholding circuit 25C form a discriminating circuit 63 for using the output signal of the first integrating circuit 5 and the output signal of the complex sine wave generating circuit 3 to determine whether the color subcarrier frequency changes at every horizontal period.

Figure 16:
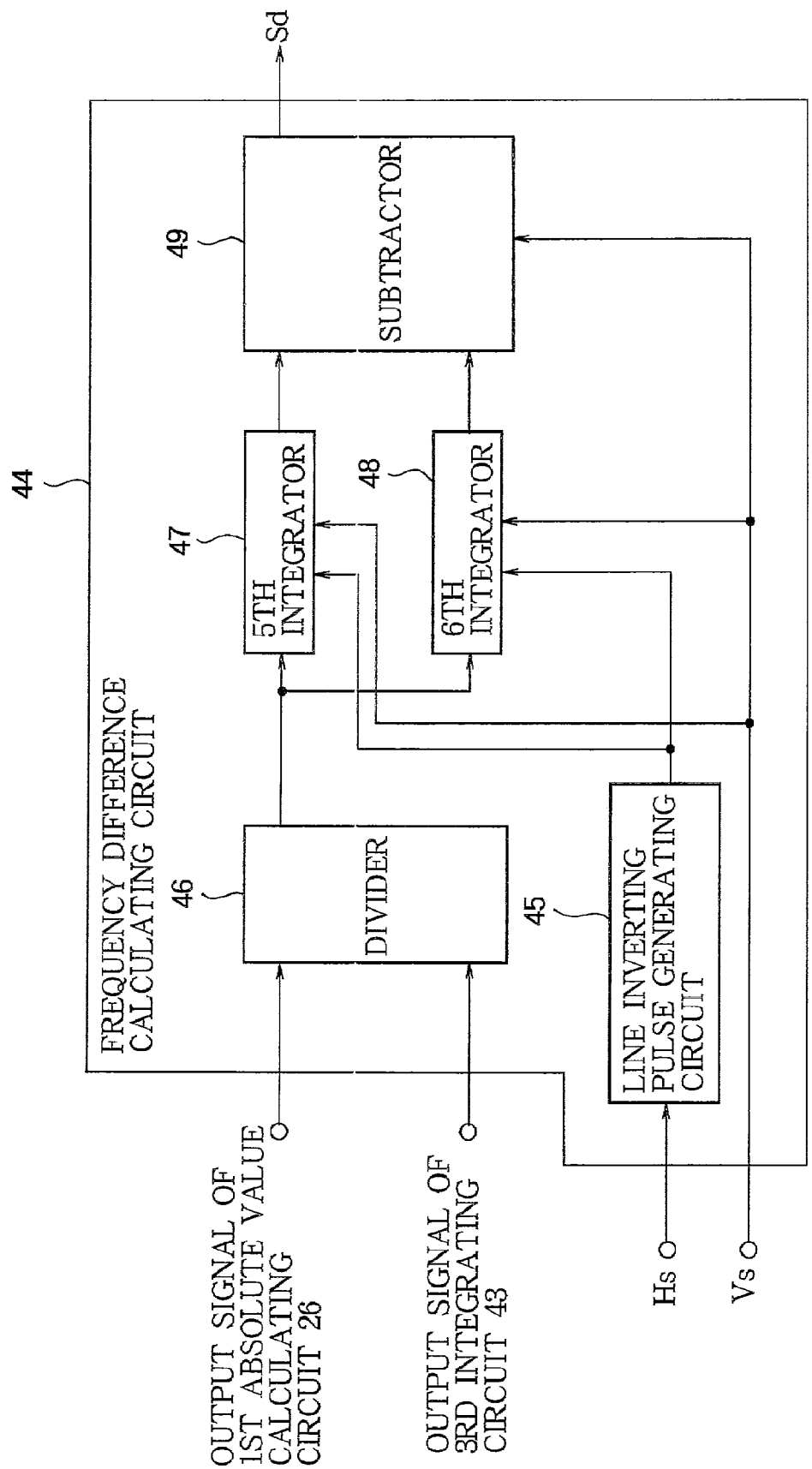
FIG. 16 is a block diagram showing the internal structure of the frequency difference calculating circuit 44 used in the fourth embodiment of this invention.

FIG. 16 is a block diagram showing the internal structure of the frequency difference calculating circuit 44. The line inverting pulse generating circuit 45 is a circuit that generates a line inverting pulse that inverts between the high and low levels each time a reference edge of the horizontal synchronizing signal is detected. A divider 46 divides the output signal of the first squaring circuit 6 by the output signal of the second integrating circuit. The division result obtained by the divider 46 is a value expressing the difference between the oscillation frequency f of the complex sine wave and the color subcarrier frequency F. The fifth integrator 47 is a circuit that resets the integrated value to zero each time the reference edge of the vertical synchronizing signal is detected and adds the division result obtained by the divider 46 to the current integrated value each time the falling edge of the line inverting pulse generated by the line inverting pulse generating circuit 45 is detected. The sixth integrator 48 is a circuit that resets the integrated value to zero each time the reference edge of the vertical synchronizing signal is detected and adds the division result obtained by the divider 46 to the current integrated value each time the rising edge of the line inverting pulse generated by the line inverting pulse generating circuit 45 is detected. Through this operation, the difference between the oscillation frequency of the complex sine wave and the color subcarrier frequency in an even-numbered line is stored in either the fifth integrator 47 or the sixth integrator 48, and a value corresponding to the difference between the oscillation frequency of the complex sine wave and the color subcarrier frequency in an odd-numbered line is stored in the other integrator. The subtractor 49 subtracts the integrated value obtained by the sixth integrator 48 from the integrated value obtained by the fifth integrator 47 at the timing of the reference edge of the vertical synchronizing signal. The output signal of the subtractor 49 indicates the result of frequency discrimination by the frequency difference calculating circuit 44. When the output signal of the frequency difference calculating circuit 44 is close to zero, the difference between the color subcarrier frequency and the reference frequency is substantially the same in odd-numbered and even-numbered lines, but as the output signal deviates from zero, the difference between the color subcarrier frequency and the oscillation frequency of the complex sine wave begins to change greatly between odd-numbered and even-numbered lines, indicating a strong possibility that the input video signal is a SECAM signal.

The thresholding circuit 25C is a circuit that outputs a high signal when the subtraction result provided as the output signal of the subtractor 49, or the output of the frequency difference calculating circuit 44, is greater than a certain threshold value, and outputs a low signal otherwise. The output signal RD of the thresholding circuit 25C indicates the frequency discrimination result. When the output signal RD of the thresholding circuit 25C is high, it indicates that there is little difference between the oscillation frequency f of the complex sine wave and the color subcarrier frequency. When the signal is low, it indicates that there is a wide difference between the oscillation frequency f of the complex sine wave and the color subcarrier frequency.

Among the circuits shown in FIGS. 15 and 16, the part up to the frequency difference calculating circuit 44 forms a frequency difference detection apparatus, and the part up to the thresholding circuit 25C forms a frequency discrimination apparatus.

The output of the frequency difference detection apparatus (output of the frequency difference calculating circuit 44) is a signal having a value corresponding to the difference between the color subcarrier frequency of the input video signal and the reference frequency; whether the frequency difference is large, or more specifically, whether the input video signal is a SECAM signal, can be determined by a comparison with a predetermined value; this comparison is performed in the thresholding circuit 25C. This feature will now be described in further detail.

As explained in the second embodiment, the output signal of the first absolute value calculating circuit 26 is AT/2 when F=f and approaches zero as the difference between F and f increases. The output signal of the third filter circuit 42 can be regarded as similar to the output signal of the first filter circuit 29 in the third embodiment. That is, the third filter circuit 42 is structured to have different gains at frequencies corresponding to sum D (=F+f) and difference d (=F−f), of the frequency F of the input signal and the reference frequency f. If the gain of the third filter circuit 42 is zero at frequency D and G at frequency d, for example, then the real part P of the output signal of the third filter circuit 42 is $$P=(AG/2)\times\sin(2\pi\Delta t+\theta)$$

and the imaginary part Q is $$Q=-(AG/2)\times\cos(2\pi\Delta t+\theta)$$

If the gain G of the third filter circuit 42 is close to unity in a wide range around d, the output signal of the second absolute value calculating circuit 27 will be substantially A/2. This also applies when the gain of the third filter circuit 42 is G at frequency D and zero at frequency d. If the third integrating circuit 43 integrates this result over a period T, the output signal of the third integrating circuit 43 becomes AT/2.

Therefore, the division result obtained by the divider 46 is unity when F=f and approaches zero as the difference between F and f increases. Because the SECAM color subcarrier frequency is switched between 4.40625 MHz and 4.25 MHz every horizontal period, if the oscillation frequency f of the complex sine wave generated by the complex sine wave generating circuit 3 is 4.43 MHz, the division result over a horizontal period having a color subcarrier frequency of 4.40625 MHz should be greater than the division result over a horizontal period having a color subcarrier frequency of 4.25 MHz. Accordingly, the fifth integrator 47 and the sixth integrator 48 should obtain different integrated values. With the PAL or NTSC color subcarrier frequency, which is constant, the integrated values obtained by the fifth integrator 47 and sixth integrator 48 should be substantially the same. Therefore, as the level of the output signal of the subtractor 49 becomes more distant from zero, the difference between F and f in the even-numbered lines differs more greatly from the difference in the odd-numbered lines, indicating a strong possibility that the input video signal is a SECAM signal.

In the fourth embodiment, because the output signal of the multiplying circuit 4 is input to the third filter circuit 42, if the value of d is very large and the frequency d falls in the stop-band of this low-pass filter, frequency discrimination becomes difficult, but since noise is removed by the third filter circuit 42, a frequency discrimination apparatus having a higher degree of noise immunity can be formed. Even if the frequency spectrum of the input signal is concentrated on two frequencies F0 and F1 and if the F1 frequency component has a large signal energy, the F0 frequency can be discriminated with high accuracy by placing F0−f in the passband of the third filter circuit 42 and F1−f in the stop-band of the third filter circuit 42.

The frequency discrimination apparatus described in the fourth embodiment recognizes when a SECAM video signal is input. By replacing the frequency difference calculating circuit 44 and the thresholding circuit 25C with the frequency difference calculating circuit 9 shown in FIG. 5 and the thresholding circuit 25A, the frequency discrimination apparatus can also be used to discriminate whether the color subcarrier frequency is 3.58 MHz or 4.43 MHz. Similarly, if the frequency difference calculating circuit 9 and thresholding circuit 25A in the first embodiment are replaced by the frequency difference calculating circuit 44 and thresholding circuit 25C in the fourth embodiment, the frequency discrimination apparatus of the first embodiment can be used as a frequency discrimination apparatus for recognizing that a SECAM video signal is input.

The frequency discrimination apparatuses of the second and third embodiments can also be used as a frequency discrimination apparatus for recognizing that the input video signal is a SECAM signal by appropriate modification of the internal structures of the frequency difference calculation circuits and the threshold processing circuits.

Fifth Embodiment

Figure 17:
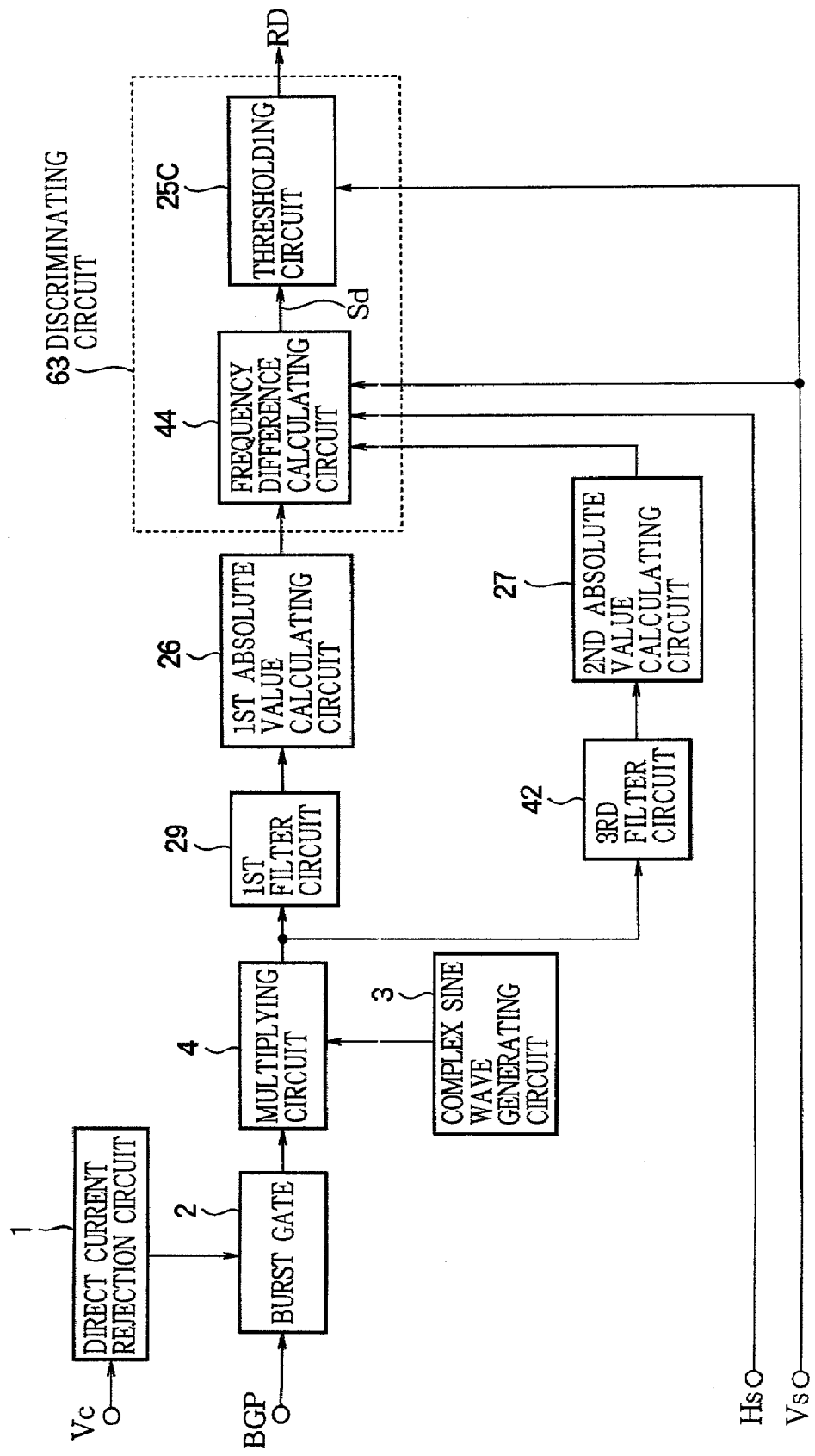
FIG. 17 is a block diagram showing the overall structure of the frequency discrimination apparatus in a fifth embodiment of this invention.

FIG. 17 shows the structure of the frequency discrimination apparatus in a fifth embodiment of this invention and a frequency difference detection apparatus forming a part thereof. Reference characters in FIG. 17 that are the same as in FIG. 12 or 15 indicate the same or similar elements.

The fifth embodiment differs from fourth embodiment by replacing the first integrating circuit 5 with the first filter circuit 29 of the third embodiment and by omitting the third integrating circuit 43.

The third filter circuit 42 in the fifth embodiment has a wider passband than the first filter circuit 29.

As explained in the third embodiment, the output of the first squaring circuit 6 of the third embodiment is $(AG/2)^2$. The output signal of the first absolute value calculating circuit 26 equals the square root of the output of the first squaring circuit 6, so its value is AG/2. As explained in the fourth embodiment, the output signal of the second absolute value calculating circuit 27 is A/2. Accordingly, the output signal of the divider 46 in the frequency difference calculating circuit 44 is G. If the gain G of the first filter circuit 29 is set to different values for the difference and sum of F and f, the frequency discrimination apparatus of the fifth embodiment can discriminate the frequency difference between F and f, for the same reason as in the third embodiment.

In the frequency difference calculation circuit shown in FIG. 15 or the frequency difference calculation circuit shown in FIG. 17, the first squaring circuit 6 and second squaring circuit 7 shown in FIG. 1 can be used instead of the first absolute value calculating circuit 26 and second absolute value calculating circuit 27.

Sixth Embodiment

The sixth embodiment is an exemplary frequency synthesis apparatus for synthesizing a frequency equal to the color subcarrier frequency of an input video signal, by using a frequency discrimination apparatus similar to the frequency discrimination apparatus in the fourth embodiment. Reference characters in FIG. 18 that are the same as in FIG. 15 indicate the same or similar elements. In the sixth embodiment, the frequency difference calculating circuit 9 and thresholding circuit 25A of the first embodiment are used instead of the frequency difference calculating circuit 44 and thresholding circuit 25C of the fourth embodiment. Both the frequency difference calculating circuit 44 and the frequency difference calculating circuit 9 have a division circuit for performing division on two inputs, so the two circuits are interchangeable.

Figure 18:
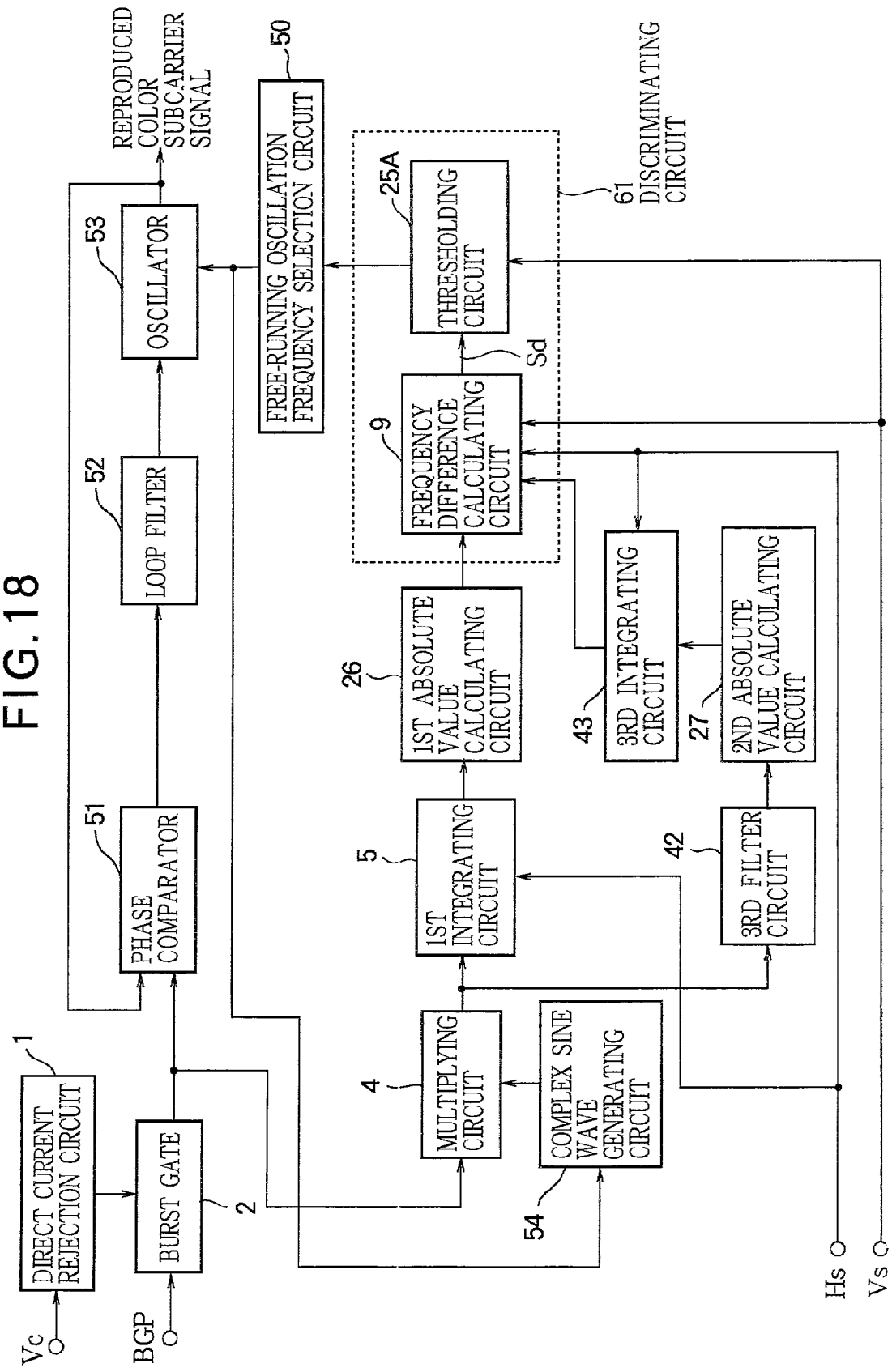
FIG. 18 is a block diagram showing the overall structure of the frequency discrimination apparatus in a sixth embodiment of this invention.

The frequency synthesis apparatus shown in FIG. 18 further includes a free-running oscillation frequency selection circuit 50, a phase comparator 51, a loop filter 52, and an oscillator 53. The phase comparator 51, loop filter 52, and oscillator 53 form a PLL.

The frequency synthesis apparatus shown in FIG. 18 uses a complex sine wave generating circuit 54 instead of the complex sine wave generating circuit 3 shown in FIG. 1. Like the complex sine wave generating circuit 3, the complex sine wave generating circuit 54 generates a complex sine wave having a frequency f. A difference is that the oscillation frequency of the complex sine wave is switched in accordance with a selection made by the free-running oscillation frequency selection circuit 50.

The color subcarrier signal of the input video signal may differ slightly from the standard value in the NTSC or PAL system. It is well known to use a phase-locked loop (PLL) to correct the difference in frequency and to reproduce a color subcarrier signal synchronized in phase with the color subcarrier of the input video signal. However, the lock range of the PLL used to reproduce the color subcarrier signal is generally not wide enough to include both the 3.58 MHz and 4.43 MHz frequencies. Accordingly, the free-running oscillation frequency of the PLL must be switched in accordance with the input signal, so that both the 3.58 MHz and 4.43 MHz color subcarriers can be reproduced with a single PLL circuit.

In the sixth embodiment, the result of frequency discrimination by the discriminating circuit 61 formed by the frequency difference calculating circuit 9 and the thresholding circuit 25A is used to switch the free-running oscillation frequency of the PLL appropriately. The discriminating circuit 61 formed by the frequency difference calculating circuit 9 and the thresholding circuit 25C outputs a high signal when the oscillation frequency f of the complex sine wave generated by the complex sine wave generating circuit 3 is substantially equal to the color subcarrier frequency F of the input video signal, and outputs a low signal otherwise (when there is a wide difference between the oscillation frequency f of the complex sine wave generated by the complex sine wave generating circuit 3 and the subcarrier frequency F of the input video signal).

The free-running oscillation frequency selection circuit 50 switches the current value of the free-running oscillation frequency between 3.58 MHz and 4.43 MHz if the frequency discrimination result remains low for a certain period of time (such as one vertical period). The following operation is performed, for example: if the currently selected value of the free-running oscillation frequency is 3.58 MHz and if the output signal of the discriminating circuit 61 remains low for one vertical period, the value of the free-running oscillation frequency is switched to 4.43 MHz. At the same time (in response to the output of the free-running oscillation frequency selection circuit 50), the complex sine wave generating circuit 54 switches its oscillation frequency f to a value equal to the free-running oscillation frequency selected by the free-running oscillation frequency selection circuit 50.

The phase comparator 51, loop filter 52, and oscillator 53 form a PLL as described above. An analog PLL circuit usually includes a charge pump disposed between the phase comparator 51 and loop filter 52, but a digital PLL circuit is assumed here and the charge pump is omitted. The phase comparator 51 multiplies the sine wave generated by the oscillator 53 by the color burst signal provided as the output signal of the burst gate 2 and finds the phase error between the two. The loop filter 52 smoothes the level of the output signal of the phase comparator 51. The oscillator 53 generates a sine wave oscillation having a frequency corresponding to the sum of the value of the free-running oscillation frequency held in the free-running oscillation frequency selection circuit 50 and the level of the output signal of the loop filter 52.

Suppose that the color subcarrier frequency F of the input video signal is slightly different from 3.58 MHz. If the free-running oscillation frequency selected by the free-running oscillation frequency selection circuit 50 is currently 3.58 MHz, the output of the discriminating circuit 61 remains high, and a frequency equal to F, which differs slightly from 3.58 MHz, is synthesized by the well known operation of the PLL. If the free-running oscillation frequency selected by the free-running oscillation frequency selection circuit 50 is currently 4.43 MHz, the color subcarrier frequency F is outside the lock range of the PLL and the PLL cannot synthesize a frequency equal to F. After the elapse of at most one vertical period, however, the output of the discriminating circuit 61 goes low and the free-running oscillation frequency selected by the free-running oscillation frequency selection circuit 50 is switched over to 3.58 MHz. When the free-running oscillation frequency selected by the free-running oscillation frequency selection circuit 50 is switched to 3.58 MHz, the color subcarrier frequency F falls within the lock range of the PLL, and a frequency equal to F is synthesized by the well known operation of the PLL.

Thus even with a PLL circuit having a narrow lock range, a wide range of frequencies can be synthesized by switching the free-running oscillation frequency of the PLL appropriately on the basis of the result of frequency discrimination by the discriminating circuit 61.

In the sixth embodiment, a frequency equal to the color subcarrier frequency F is synthesized by using a single frequency discrimination apparatus and by switching the oscillation frequency f of the complex sine wave in accordance with the free-running oscillation frequency, but a plurality of frequency discrimination apparatuses in which the oscillation frequency f of the complex sine wave is tied to different values may be used. For example, if a frequency discrimination apparatus in which the oscillation frequency f of the complex sine wave is 3.58 MHz and a frequency discrimination apparatus in which the oscillation frequency f of the complex sine wave is 4.43 MHz are used, the free-running oscillation frequency selected by the free-running oscillation frequency selection circuit 50 will be 3.58 MHz when the output of the discrimination circuit in the frequency discrimination apparatus with f=3.58 MHz is high and the output of the discrimination circuit in the frequency discrimination apparatus with f=4.43 MHz is low, the free-running oscillation frequency selected by the free-running oscillation frequency selection circuit 50 will be 4.43 MHz when the output of the discrimination circuit in the frequency discrimination apparatus with f=3.58 MHz is low and the output of the discrimination circuit in the frequency discrimination apparatus with f=4.43 MHz is high, and the free-running oscillation frequency currently selected by the free-running oscillation frequency selection circuit 50 will remain unchanged when the outputs of both discrimination circuits are the same.

In the sixth embodiment, a separate oscillator 53 and complex sine wave generating circuit 54 are provided, but the oscillator 53 may be omitted and its function may be performed by the complex sine wave generating circuit 54, which generates both sine and cosine waves. In that case, the complex sine wave generating circuit 54 is switched between a 3.58-MHz mode of operation and a 4.43 MHz mode of operation, and the discrimination performed by the frequency difference calculating circuit 9 is switched accordingly. If the oscillation frequency f of the complex sine wave generating circuit 54 is set to a value equal to a frequency corresponding to the sum of the value of the free-running oscillation frequency selected by the free-running oscillation frequency selection circuit 50 and the level of the output signal of the loop filter 52, the oscillator 53 becomes unnecessary. In that case, f varies within a frequency range corresponding substantially to the lock range of the PLL, but the frequency difference between the upper limit and the lower limit of the lock range of the PLL is smaller than the frequency difference between 3.58 MHz and 4.43 MHz. Accordingly, using the same circuit as both the complex sine wave generating circuit 54 and the oscillator 53 has little effect on the operation of the frequency difference calculating circuit 9.

The frequency synthesis apparatus described above is structured with the frequency difference calculation circuit of the fourth embodiment. The same frequency synthesis apparatus can be structured by using the frequency difference calculation circuit of any of the first, second, third, and fifth embodiments instead of the frequency difference calculation circuit of the fourth embodiment.

Seventh Embodiment

A plurality of frequency difference detection apparatuses having different reference frequencies may be provided, the frequency difference detection apparatus outputting the smallest frequency difference may be selected, and the free-running oscillation frequency of the phase-locked loop may be tied to the reference frequency of the selected phase difference detection apparatus.

Figure 19:
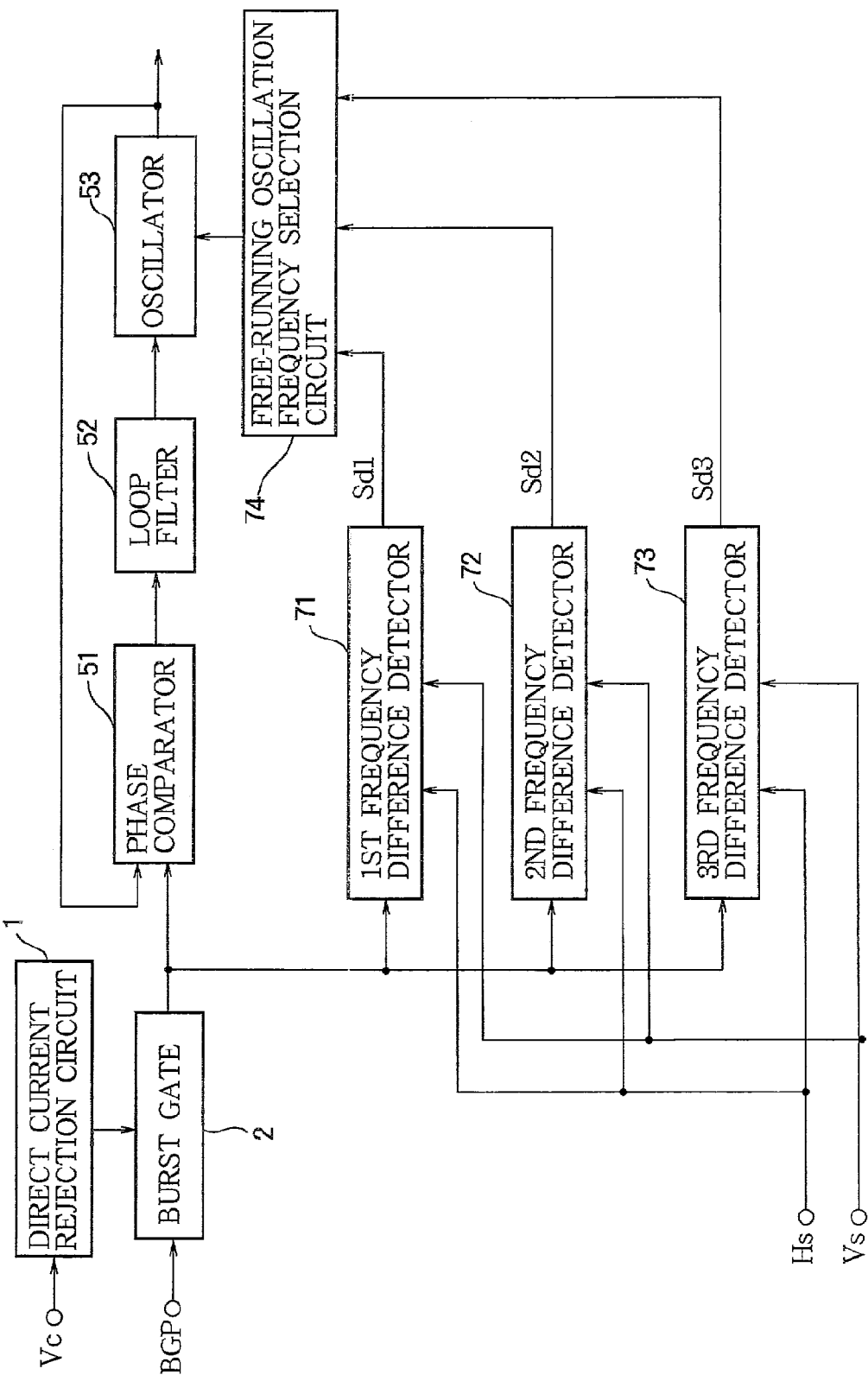
FIG. 19 is a block diagram showing the overall structure of the frequency discrimination apparatus in a seventh embodiment of this invention.

FIG. 19 shows the structure of a frequency synthesis apparatus that operates in this way.

The illustrated frequency synthesis apparatus includes a frequency difference detector 71, a frequency difference detector 72, a frequency difference detector 73, a free-running oscillation frequency selection circuit 74, a phase comparator 51, a loop filter 52, an oscillator 53, a direct current rejection circuit 1, and a burst gate 2.

The loop filter 52, oscillator 53, direct current rejection circuit 1, and burst gate 2 are the same as shown in FIG. 18.

Each of the frequency difference detectors 71, 72, 73 has the same structure as the frequency difference detection apparatus described in the first embodiment, but the three frequency difference detectors 71, 72, 73 have different reference frequencies, and output different signals Sd1 to Sd3 corresponding to the difference between the frequency of the input signal and their reference frequencies.

On the basis of the output signals Sd1 to Sd3 output from the frequency difference detectors 71 to 73, the free-running oscillation frequency selection circuit 74 selects the frequency difference detection apparatus 71, 72, or 73 that outputs a value indicating the smallest frequency difference, and thereby ties the free-running oscillation frequency to the reference frequency of the selected frequency difference detection apparatus.

The frequency difference detection apparatus of any of the second to fifth embodiments may be used instead of the frequency difference detection apparatus of the first embodiment.

The frequency difference detection apparatuses, frequency discrimination apparatuses, and frequency synthesis apparatuses of the embodiments described above can be implemented at least partly by software, that is, by a programmed computer. Frequency difference detection apparatuses, frequency discrimination apparatuses, and frequency synthesis apparatuses according to the present invention have been described, but the frequency difference detection methods, frequency discrimination methods, and frequency synthesis methods which have been explained in the descriptions of those apparatuses also form part of the present invention.

What is claimed is:

1. A frequency difference detection apparatus for detecting a difference between a frequency of an input signal and a predetermined reference frequency, the frequency difference detection apparatus comprising:
    a complex sine wave generating means for generating a complex sine wave having an oscillation frequency equal to the reference frequency;
    a multiplication means for multiplying the complex sine wave generated by the complex sine wave generating means by said input signal;
    a first integrating means for integrating a result of multiplication by the multiplication means in the time direction;
    a first absolute value calculating means for finding a value proportional to an absolute value, or a square of the absolute value, of a result of integration by the first integrating means;
    a second absolute value calculating means for finding a value proportional to an absolute value, or a square of the absolute value, of an instantaneous amplitude of said input signal;
    a second integrating means for integrating a result obtained by the second absolute value calculating means in the time direction; and
    a frequency difference calculating means for finding the difference between the frequency of said input signal and the reference frequency, based on a ratio between a result obtained by the first absolute value calculating means and the result obtained by the second integrating means.

2. A frequency difference detection apparatus for detecting a difference between a frequency of an input signal and a predetermined reference frequency, the frequency difference detection apparatus comprising:
    a complex sine wave generating means for generating a complex sine wave having an oscillation frequency equal to the reference frequency;
    a multiplication means for multiplying the complex sine wave generated by the complex sine wave generating means by said input signal;
    a first filtering means having a result of multiplication by the multiplication means as input, and having mutually differing gains at a frequency equivalent to a sum of the frequency of said input signal and the reference frequency and at a frequency equivalent to their difference;

a first absolute value calculating means for finding a value proportional to an absolute value, or a square of the absolute value, of a signal output by the first filtering means;

a second absolute value calculating means for finding a value proportional to an absolute value, or a square of the absolute value, of an instantaneous amplitude of said input signal;

a second filtering means having a result obtained by the second absolute value calculating means as input, and having a relatively greater gain at direct current than at a frequency equivalent to twice the frequency of said input signal; and a frequency difference calculating means for finding the difference between the frequency of said input signal and the reference frequency, based on a ratio between a result obtained by the first absolute value calculating means and the output of the second filtering means.

3. A frequency difference detection apparatus for detecting a difference between a frequency of an input signal and a predetermined reference frequency, the frequency difference detection apparatus comprising:

a complex sine wave generating means for generating a complex sine wave having an oscillation frequency equal to the reference frequency;

a multiplication means for multiplying the complex sine wave generated by the complex sine wave generating means by said input signal;

a first integrating means for integrating a result of multiplication by the multiplication means in the time direction;

a first absolute value calculating means for finding a value proportional to an absolute value, or a square of the absolute value, of an output of the first integrating means;

a direct current rejection means for removing at least a direct current component from said input signal;

a second absolute value calculating means for finding a value proportional to an absolute value, or a square of the absolute value, of an instantaneous amplitude of a signal output from the direct current rejection means;

a second integrating means for integrating a result obtained by the second absolute value calculating means in the time direction; and a frequency difference calculating means for finding the difference between the frequency of said input signal and the reference frequency, based on a ratio between a result obtained by the first absolute value calculating means and an output of the second integrating means.

4. The frequency difference detection apparatus of claim 3, wherein the direct current rejection means comprises a bandpass filter or a high-pass filter having a stop-band at direct current.

5. The frequency difference detection apparatus of claim 3, wherein the direct current rejection means attenuates a signal level equivalent to a direct current level of said input signal from said input signal and outputs the attenuated input signal.

6. A frequency difference detection apparatus for detecting a difference between a frequency of an input signal and a predetermined reference frequency, the frequency difference detection apparatus comprising:

a complex sine wave generating means for generating a complex sine wave having an oscillation frequency equal to the reference frequency;

a multiplication means for multiplying the complex sine wave generated by the complex sine wave generating means by said input signal;

a first integrating means for integrating a result of multiplication by the multiplication means in the time direction;

a first absolute value calculating means for finding a value proportional to an absolute value, or a square of the absolute value, of a result of integration by the first integrating means;

a filtering means having the result of multiplication by the multiplication means as input, and having mutually differing gains at a frequency equivalent to a sum of the frequency of said input signal and the reference frequency and at a frequency equivalent to their difference;

a second absolute value calculating means for finding a value proportional to an absolute value, or a square of the absolute value, of a signal output from the filtering means;

a second integrating means for integrating a signal output from the second absolute value calculating means in the time direction; and a frequency difference calculating means for finding the difference between the frequency of said input signal and the reference frequency, based on a ratio between the result obtained by the first absolute value calculating means and the output of a result obtained by the second integrating means.

7. A frequency discrimination apparatus having:

the frequency difference detection apparatus of claim 6; and a threshold value processing means for comparing the difference detected by the frequency difference detection apparatus with a predetermined threshold value and determining whether the difference between the frequency of said input signal and the reference frequency is small.

8. The frequency discrimination apparatus of claim 7, wherein the reference frequency, which expresses the oscillation frequency of the complex sine wave generated by the complex sine wave generating means, is variable.

9. The frequency discrimination apparatus of claim 7, wherein, when the difference between the frequency of said input signal and the reference frequency is determined by the threshold value processing circuit to be large, the complex sine wave generating means changes the reference frequency to a different value.

10. A frequency synthesizer for synthesizing a signal having a frequency equal to a frequency of an input signal, comprising:

the frequency discrimination apparatus of claim 7; and a phase locked loop for generating a signal locked in phase with said input signal; wherein a free-running oscillation frequency of the phase locked loop changes in accordance with the reference frequency of the frequency discrimination apparatus.

11. A frequency synthesizer for synthesizing a signal having a frequency equal to a frequency of an input signal, comprising:

a plurality of the frequency difference detection apparatuses of claim 6, having different reference frequencies;

a selection means for selecting, from the plurality of frequency difference detection apparatuses, the one with the reference frequency differing least from the frequency of said input signal, based on results detected by the plurality of frequency difference detection apparatuses.

12. A frequency difference detection apparatus that detects the difference between the frequency of an input signal and a predetermined reference frequency, the frequency difference detection apparatus comprising:

a complex sine wave generating means for generating a complex sine wave having an oscillation frequency equal to the reference frequency;

a multiplication means for multiplying the complex sine wave generated by the complex sine wave generating means by said input signal;

a first filtering means having a result of multiplication by the multiplication means as input, and having mutually differing gains at a frequency equivalent to a sum of the frequency of said input signal and the reference frequency and at a frequency equivalent to their difference;

a first absolute value calculating means for finding a value proportional to an absolute value, or a square of the absolute value, of a signal output by the first filtering means;

a second filtering means having the result obtained by multiplication in the multiplication means as input, having mutually differing gains at a frequency equivalent to a sum of the frequency of said input signal and the reference frequency and at a frequency equivalent to their difference, and having a wider passband than the first filtering means;

a second absolute value calculating means for finding a value proportional to an absolute value, or a square of the absolute value, of a signal output from the second filtering means; and a frequency difference calculating means for finding the difference between the frequency of said input signal and the reference frequency, based on a ratio between a result obtained by the first absolute value calculating means and a result obtained by the second absolute value calculating means.

13. A frequency difference detection method for detecting a difference between a frequency of an input signal and a predetermined reference frequency, the frequency difference detection method comprising:

a complex sine wave generating step for generating a complex sine wave having an oscillation frequency equal to the reference frequency;

a multiplication step for multiplying the complex sine wave generated in the complex sine wave generating step by said input signal;

a first integrating step for integrating a result of multiplication in the multiplication step in the time direction;

a first absolute value calculating step for finding a value proportional to an absolute value, or a square of the absolute value, of a result of integration in the first integrating step;

a second absolute value calculating step for finding a value proportional to an absolute value, or a square of the absolute value, of an instantaneous amplitude of said input signal;

a second integrating step for integrating a result obtained in the second absolute value calculating step in the time direction; and a frequency difference calculating step for finding the difference between the frequency of said input signal and the reference frequency, based on a ratio between a result obtained in the first absolute value calculating step and the result obtained in the second absolute value calculating integrating step.

14. A frequency difference detection method that detects the difference between the frequency of an input signal and a predetermined reference frequency, the frequency difference detection method comprising:

a complex sine wave generating step for generating a complex sine wave having an oscillation frequency equal to the reference frequency;

a multiplication step for multiplying the complex sine wave generated in the complex sine wave generating step by said input signal;

a first filtering step having a result of multiplication in the multiplication step as input, and having mutually differing gains at a frequency equivalent to a sum of the frequency of said input signal and the reference frequency and at a frequency equivalent to their difference;

a first absolute value calculating step for finding a value proportional to an absolute value, or a square of the absolute value, of a signal obtained as a result of filtering in the first filtering step;

a second absolute value calculating step for finding a value proportional to an absolute value, or a square of the absolute value, of an instantaneous amplitude of said input signal;

a second filtering step having a result obtained in the second absolute value calculating step as input, and having a relatively greater gain at direct current than at a frequency equivalent to twice the frequency of said input signal; and a frequency difference calculating step for finding the difference between the frequency of said input signal and the reference frequency, based on a ratio between a result obtained in the first absolute value calculating step and a signal obtained as a result of filtering in the second filtering step.

15. A frequency difference detection method that detects the difference between the frequency of an input signal and a predetermined reference frequency, the frequency difference detection method comprising:

a complex sine wave generating step for generating a complex sine wave having an oscillation frequency equal to the reference frequency;

a multiplication step for multiplying the complex sine wave generated in the complex sine wave generating step by said input signal;

a first integrating step for integrating a result of multiplication in the multiplication step in the time direction;

a first absolute value calculating step for finding a value proportional to an absolute value, or a square of the absolute value, of a signal obtained as a result of integration in the first integrating step;

a direct current rejection step for removing at least a direct current component from said input signal;

a second absolute value calculating step for finding a value proportional to an absolute value, or a square of the absolute value, of an instantaneous amplitude of a signal obtained as a result of rejection in the direct current rejection step;

a second integrating step for integrating a result obtained in the second absolute value calculating step in the time direction; and a frequency difference calculating step for finding the difference between the frequency of said input signal and the reference frequency, based on a ratio between a result obtained in the first absolute value calculating step and a signal obtained by as a result of integration in the second integrating step.

16. The frequency difference detection method of claim 15, wherein the direct current rejection step attenuates a signal level equivalent to a direct current level of said input signal from said input signal and outputs the attenuated input signal.

17. A frequency difference detection method that detects the difference between the frequency of an input signal and a predetermined reference frequency, the frequency difference detection method comprising:

a complex sine wave generating step for generating a complex sine wave having an oscillation frequency equal to the reference frequency;

a multiplication step for multiplying the complex sine wave generated in the complex sine wave generating step by said input signal;

a first integrating step for integrating a result of multiplication in the multiplication step in the time direction;

a first absolute value calculating step for finding a value proportional to an absolute value, or a square of the absolute value, of a result of integration in the first integrating step;

a filtering step having the result of multiplication in the multiplication step as input, and having mutually differing gains at a frequency equivalent to a sum of the frequency of said input signal and the reference frequency and at a frequency equivalent to their difference;

a second absolute value calculating step for finding a value proportional to an absolute value, or a square of the absolute value, of a signal obtained by filtering in the filtering step;

a second integrating step for integrating a signal obtained as a result in the second absolute value calculating step in the time direction; and a frequency difference calculating step for finding the difference between the frequency of said input signal and the reference frequency, based on a ratio between a result obtained in the first absolute value calculating step and a result obtained in the second integrating step.

18. A frequency discrimination method having a threshold value processing step for comparing the difference detected by the frequency difference detection method of claim 17 with a predetermined threshold value and determining whether the difference between the frequency of said input signal and the reference frequency is small.

19. The frequency discrimination method of claim 18, wherein the reference frequency, which expresses the oscillation frequency of the complex sine wave generated by the complex sine wave generating step, is variable.

20. The frequency discrimination method of claim 18, wherein, when the difference between the frequency of said input signal and the reference frequency is determined in the threshold value processing step to be large, the complex sine wave generating step changes the reference frequency to a different value.

21. A frequency synthesizing method for synthesizing a signal having a frequency equal to a frequency of an input signal, having a phase locking step for generating a signal locked in phase with said input signal; wherein a free-running oscillation frequency of the phase locking step changes in accordance with the reference frequency of the frequency discrimination method of claim 18.

22. A frequency synthesizing method for synthesizing a signal having a frequency equal to a frequency of an input signal, comprising:

a selection step for selecting, on the basis of results detected by a plurality of frequency difference detection methods as recited in claim 17, a one of the plurality of frequency difference detection methods in which the reference frequency differs least from the frequency of said input signal, the plurality of frequency difference detection methods having mutually different reference frequencies; and a phase locking step of generating a signal locked in phase with said input signal; wherein a free-running oscillation frequency of the phase locking step changes in accordance with the reference frequency of the frequency discrimination method selected in the selection step.

23. A frequency difference detection method that detects the difference between the frequency of an input signal and a predetermined reference frequency, the frequency difference detection method comprising:

a complex sine wave generating step for generating a complex sine wave having an oscillation frequency equal to the reference frequency;

a multiplication step for multiplying the complex sine wave generated in the complex sine wave generating step by said input signal;

a first filtering step having a result of multiplication by the multiplication step as input, and having mutually differing gains at a frequency equivalent to a sum of the frequency of said input signal and the reference frequency and at a frequency equivalent to their difference;

a first absolute value calculating step for finding a value proportional to an absolute value, or a square of the absolute value, of a signal obtained as a result of filtering in the first filtering step;

a second filtering step having the result obtained by multiplication in the multiplication step as input, having mutually differing gains at a frequency equivalent to a sum of the frequency of said input signal and the reference frequency and at a frequency equivalent to their difference, and having a wider passband than the first filtering step;

a second absolute value calculating step for finding a value proportional to an absolute value, or a square of the absolute value, of a signal obtained as a result of filtering in the second filtering step; and a frequency difference calculating step for finding the difference between the frequency of said input signal and the reference frequency, based on a ratio between a result obtained in the first absolute value calculating step and a result obtained in the second absolute value calculating step.

* * * * *